(12) United States Patent
Ohshima et al.

(10) Patent No.: US 7,184,282 B2
(45) Date of Patent: Feb. 27, 2007

(54) SINGLE-PHASE POWER CONVERSION DEVICE AND THREE-PHASE POWER CONVERSION DEVICE

(75) Inventors: Masaaki Ohshima, Tokyo (JP);
Hirokazu Shimizu, Tokyo (JP);
Shuichi Ushiki, Tokyo (JP)

(73) Assignees: Origin Electric Company, Limited, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 11/368,480

(22) Filed: Mar. 7, 2006

(65) Prior Publication Data
US 2006/0256586 A1 Nov. 16, 2006

(30) Foreign Application Priority Data
Mar. 11, 2005 (JP) ............................. 2005-070118
Jun. 3, 2005 (JP) ............................. 2005-164588

(51) Int. Cl.
*H02M 1/12* (2006.01)
*H02M 7/122* (2006.01)

(52) U.S. Cl. ...................................... 363/40; 363/55
(58) Field of Classification Search .................. 363/40, 363/41, 55, 95, 97, 131
See application file for complete search history.

(56) References Cited

U.S. PATENT DOCUMENTS

| 5,504,667 | A  | * | 4/1996 | Tanaka et al. | ............... | 363/37 |
| 6,678,174 | B2 | * | 1/2004 | Suzui et al.  | ............... | 363/55 |
| 6,937,488 | B2 | * | 8/2005 | Eguchi        | ............... | 363/97 |
| 6,963,190 | B2 | * | 11/2005 | Asanuma et al. | ........... | 323/283 |

FOREIGN PATENT DOCUMENTS

| JP | 5-316754 | 11/1993 |
| JP | 6-217559 | 8/1994 |

OTHER PUBLICATIONS

Masaaki Ohshima, entitled "*Current Error Tracking Mode AC Current Waveform Control Method for Single Phase Self Commutated Voltage Source Power Converters*", T.IEE Japan, vol. 114-D, No. 3. '94, pp. 289-298.
Masaaki Ohshima et al., entitled "*A Novel Three-Phase UPS Inverter Driven by Error-Tracking-Mode PWM Scheme*", IEEJ Trans. IA, vol. 125, No. 2, 2005, pp. 164-173.

* cited by examiner

*Primary Examiner*—Adolf Berhane
(74) *Attorney, Agent, or Firm*—Wenderoth, Lind & Ponack, L.L.P.

(57) ABSTRACT

To suppress a DC component in AC power in a power converter for converting DC power to AC power. DC power is converted to AC power by a converter 2, and the AC power is supplied to output terminals u1 and u2 via an inductor 3. The converter 2 is controlled based on an error $\Delta(t)$ between an output current $i_p(t)$ outputted from the converter 2 and a target current $j(t)$ outputted from a target current generation means 110 as a target value for the output current $i_p(t)$, and a DC component $V_D$ in an output terminal voltage $v(t)$ is detected by a voltage detection means 18. A DC component $I_D$ is suppressed by correcting a target current $j(t)$ by a DC component suppression means 8. Also, a DC component in the AC power is suppressed to prevent biased magnification of a transformer 4 by calculating a correction amount $j_h(t)$ for correcting the target current $j(t)$ from the difference between a first instantaneous value d1 of a load current $i_s(t)$ flowing to a load 4 at a first time point t1 and a second instantaneous value d2 of the load current $i_s(t)$ at a second time point t2 that is a half cycle after the first time point to correct the target current $j(t)$.

14 Claims, 28 Drawing Sheets

PRIMARY VOLTAGE OF TRANSFORMER

WAVEFORM OF LOAD CURRENT

CORRECTION CURRENT (1) PRIMARY VOLTAGE OF TRANSFORMER (2) WAVEFORM OF LOAD CURRENT (1) PRIMARY VOLTAGE OF TRANSFORMER (2) WAVEFORM OF LOAD CURRENT (3) CORRECTION CURRENT

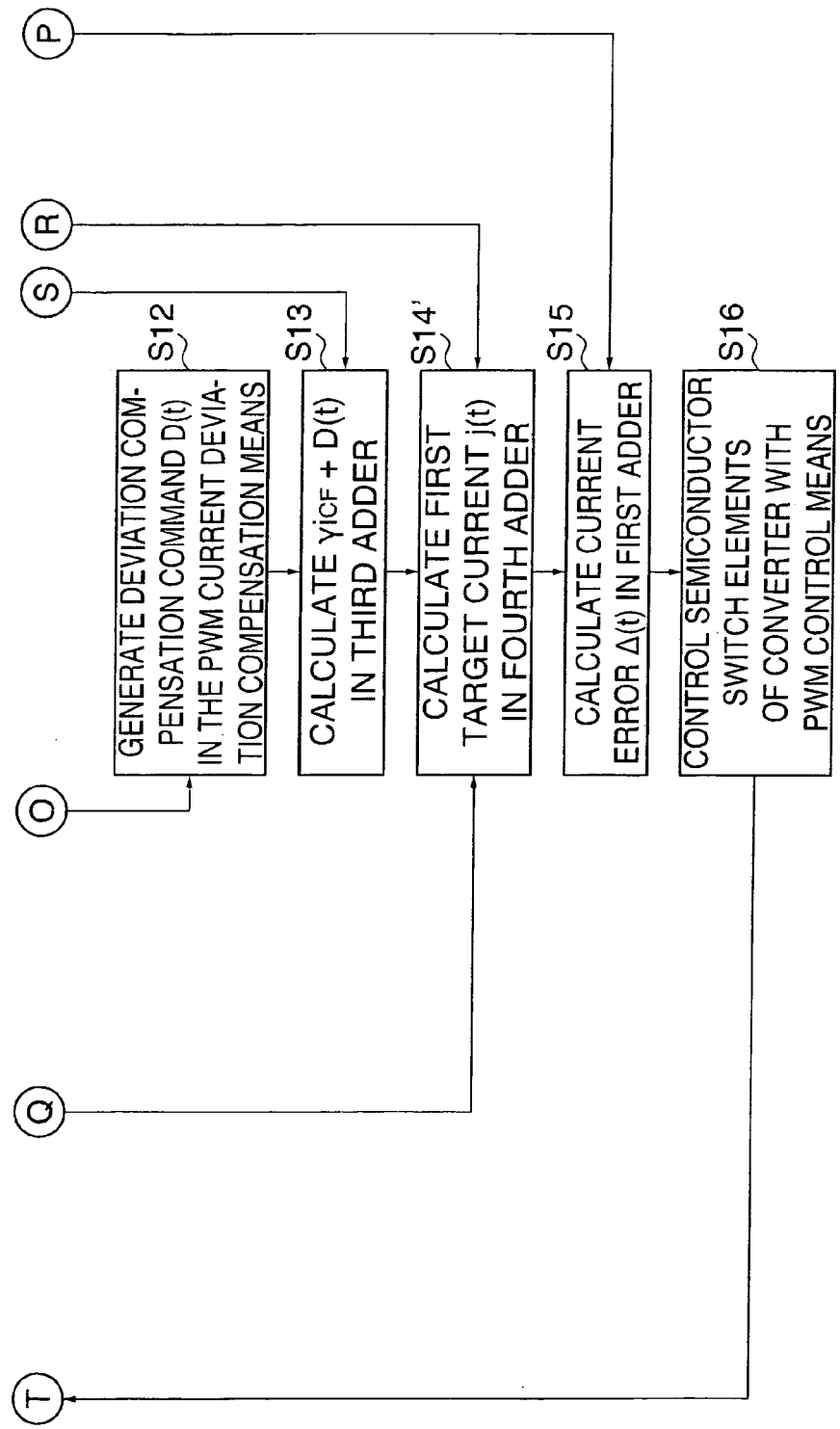

SINGLE-PHASE POWER CONVERSION DEVICE AND THREE-PHASE POWER CONVERSION DEVICE

BACKGROUND OF THE INVENTION

1. Technical Field

The present invention relates to a single-phase power conversion device and a three-phase power conversion device. More specifically, the present invention relates to a single-phase power conversion device and a three-phase power conversion device for converting DC power to AC power in which a DC component in the AC power is suppressed by extracting the DC component from the output terminal voltage and correcting a target current.

2. Related Art

Many power conversion devices have a transformer to insulate a converter thereof from a load or to make the converter output compatible with the system voltage of the load. When a DC component is introduced into the input voltage to the transformer on the load side because of temperature drift or offset in the control system, the iron core of the transformer is magnetized in one direction by the DC component, which causes uneven distribution of magnetic flux called biased magnetization. Then, the problem arises that the excitation inductance of the transformer extremely decreases to cause flow of excessively large excitation current, distortion of output voltage, local temperature rise in the transformer, increase of electromagnetic noise and so on, and the AC power supplied from the power conversion device becomes unstable.

As a method for solving the problem, a DC component suppression method as follows has been disclosed: A saturable reactor and a reactor which allows excitation current proportional to the number of interlinking magnetic flux to flow through it are connected in parallel on the primary side of a transformer. A DC component is detected from the excitation current flowing through the reactors and fed back to the control of an inverter control circuit for a converter to compensate for the biased magnetization of the transformer. When no DC component is contained in the AC power outputted from the converter, a positive-negative symmetric current flows through the reactors and no DC component is generated in the output from an operational amplifier for integrating the current flowing through the reactors. When a DC component is contained in the AC power, a positive-negative asymmetric current flows through the reactors and a DC component proportional to the amount of magnetic saturation is detected in the output from the operational amplifier. Thus, the peak values of asymmetric positive and negative excitation currents flowing through the saturable reactor and the reactor are detected and the excitation currents in one cycle are integrated in an integration circuit to detect the DC component proportional to the amount of magnetic saturation in order to compensate for the biased magnetization of the transformer (see Patent Documents 1 and 2, for example).

On the other hand, an error tracking mode AC current control method has been proposed as a current control method for a power conversion device by the present inventors in which a target current is generated by a target current generation means and PWM (pulse width modulation) control of a converter is performed so that the output current can follow the target current (see Non-Patent Documents 1 and 2, for example).

FIG. 21 shows an example of the circuit configuration of a single-phase power conversion device employing an error tracking mode AC current control method. Designated as 1 is a DC power source (source voltage $E_B$) for supplying DC power. A main circuit 100 is mainly composed of a converter 2 for converting the DC power supplied from the DC power source 1 to AC power, lines a1 and a2 through which a current flows to output terminals u1 and u2 via an inductor 3 (inductance component $L_p$), and a filter circuit 5 interposed between the inductor 3 and the output terminals u1 and u2 and connected between the output terminals u1 and u2 (between the lines a1 and a2). The filter circuit 5 is a circuit of a resistance $R_F$ and a capacitor $C_F$ connected in series and removes a switching frequency component in the AC power produced by the converter 2. The converter 2 has a full bridge circuit composed of power devices (semiconductor switch elements). As the semiconductor switch elements, IGBTs (insulated gate bipolar transistors), for example, can be used. Designated as 4 is a load connected to the output terminals u1 and u2.

Designated as 18 is a voltage detection means for detecting a filter voltage v(t) applied across the connection points of the filter circuit 5 and the lines a1 and a2 as an output terminal voltage. Designated as 19 is a first current detection means for detecting an output current $i_p(t)$ flowing from the converter 2 to the inductor 3. Designated as 7 is a second current detection means for detecting a load current $i_s(t)$ flowing from the output terminals u1 and u2 to the load 4. The output current $i_p(t)$ is detected from the line a1 or a2 at a point in the vicinity of the converter 2, and the load current $i_s(t)$ is detected from the line a1 or a2 at a point in the vicinity of the output terminal u1 or u2. The inductor 3 is used to control the output current $i_p(t)$. Designated as 17 is a PWM (pulse width modulation) control means (converter control means) for controlling the converter 2 and controls the converter 2 by supplying on-off signal pulses to the gates of a plurality of semiconductor switch elements of the converter 2. The control of the output current $i_p(t)$ is performed by gate control by the PWM control means 17. The symbol t represents time.

Designated as 110 is a target current generation means for generating a target current j(t) as a target value for the output current $i_p(t)$ by calculation. Designated as 13, 9 and 14 in the target current generation means 110 are first, second and third amplifiers with amplification factors of α, β and γ, respectively, for amplifying received input signals.

Designated as 10 is a filter voltage command means for generating a filter voltage command Vc(t) as a target value for the output terminal voltage, that is, the filter voltage v(t), as 11 is a filter current command means for generating a filter current command $i_{CF}(=C_F(dv_c/dt)$ as a target value for the fitter current flowing through the capacitor $C_F$ of a filter, and as 12 is a PWM current deviation compensation means for generating a deviation compensation command D(t) for compensating for the deviation between the output current $i_p(t)$ and the target current j(t).

FIG. 22A and FIG. 22B shows an example of the process flow of the control of the power conversion in the above single-phase power conversion device. As a step of converting DC power to AC power to be supplied to the load, DC power is converted to single-phase AC power in the converter 2 (step S1), and the AC power is supplied to the load 4 (step S2).

The output terminal voltage applied to the load 4, that is, the filter voltage v(t) applied across the connection points of the filter circuit 5 and the lines a1 and a2 is detected by the voltage detection means 18 (step S3), the load current $i_s(t)$ flowing to the load 4 is detected by the second current detection means 7 (step S4), and the output current $i_p(t)$ flowing from the converter 2 to the inductor 3 (inductance component $L_p$) is detected by the first current detection means 19 (step S5).

The process of control of the target current generation means 110 is next described.

The filter voltage command $V_c(t)$ generated by the filter voltage command means 10 (step S6) and the filter voltage v(t) detected by the voltage detection means 18 are subjected to subtraction in a second adder 15 to obtain the error therebetween (step S7). The error is multiplied by α in the first amplifier 13 (step S8), and the result is inputted into a fourth adder 16.

The load current $i_s(t)$ detected by the second current detection means 7 is multiplied by β in the second amplifier 9 (step S9), and the result is inputted into the fourth adder 16 and serves as feedforward for the load current $i_s(t)$.

The filter current command $i_{CF}$ generated by the filter current command means 11 (step S10) is multiplied by γ in the third amplifier 14 (step S11), and the result is inputted into a third adder 21.

The deviation compensation command D(t) generated by the PWM current deviation compensation means 12 (step S12), which is used to compensate for the deviation between the target current j(t) and an actual output current $i_p(t)$ flowing from the converter 2 to the inductor 3, is inputted into the third adder 21 and added to the filter current command $i_{CF}$ multiplied by γ (step S13).

The filter voltage error (filter voltage command Vc(t)– filter voltage v(t)) multiplied by α, the load current $i_s(t)$ multiplied by β, and the result of addition in the third adder 21 are added in the fourth adder 16 to obtain a target current j(t) as an output therefrom (step S14'). The output voltage $i_p(t)$ detected by the first current detection means 19 is subtracted from the target current j(t) to obtain an error Δ(t) in a first adder 20 (step S15). The PWM control means 17 generates on-off signal pulses based on the error Δ(t) obtained in the first adder 20 and supplies the on-off signal pulses to the gates of the semiconductor switch elements of the converter 2 to control the converter 2 (step S16).

The case of a three-phase power conversion device is next described. The voltage detection means 18 detects line voltages (voltages between lines) $v_{ab}(t)$, $v_{bc}(t)$ and $v_{ca}(t)$ across three output terminals u, v and w the output terminal voltage <v(t)>. In the case of a three-phase power conversion device, the output current <$i_p(t)$> detected by the first current detection means 19 has three components $i_{pa}(t)$, $i_{pb}(t)$ and $i_{pc}(t)$, and the load current <$i_s(t)$> detected by the second current detection means 7 has three components $i_{sa}(t)$, $i_{sb}(t)$ and $i_{sc}(t)$. Accordingly, the target current <j(t)> also has three components $j_a(t)$, $j_b(t)$ and $j_c(t)$ corresponding to three phases, and the target current generation means 110 processes the three components. Here, the symbol <> represents a vector quantity (the same is hereinafter applied)

FIG. 23 shows an example of the circuit configuration of a three-phase power conversion device employing an error tracking mode AC current control method. Those parts having the same functions as those in FIG. 21 are designated in the drawing by the same reference numerals, and their description is omitted. The differences from the device shown FIG. 21 are mainly described. The converter 2 outputs three-phase AC power as the AC power. The main circuit 100 is composed of the converter 2, three lines a, b and c through which a current flows from the converter 2 to output terminals u, v and w via inductors 3 (inductance components $L_{Pa}$, $L_{Pb}$ and $L_{Pc}$) and a filter circuit 5 interposed between the inductors 3 and the output terminals u, v and w and connected between the output terminals u, v and w (lines a, b and c). The filter circuit 5 has a circuit of three capacitors $C_F$ connected in a delta configuration and resistances $R_F$ interposed between the three terminals of the delta configuration and the three lines a, b and c, and functions as a filter for removing switching frequency components between the three phases as in the case with a single-phase power conversion device.

A voltage detection means 18 is located in the vicinity of the filter circuit 5 and detects a filter voltage <v(t)> ($v_{ab}(t)$, $v_{bc}(t)$, $v_{ca}(t)$) applied across the connection points of the filter circuit 5 and the lines a, b and c (that is, across lines a and b, lines b and c and lines c and a) as the output terminal voltage v(t). A first current detection means 19 is located in the vicinity of the converter 2 on the three lines a, b and c and detects an output current <$i_p(t)$> ($i_{pa}(t)$, $i_{pb}(t)$, $i_{pc}(t)$) flowing from the converter 2 to the three inductors 3 (inductance components $L_{pa}$, $L_{pb}$ and $L_{pc}$). A second current detection means 7 is located in the vicinity of the output terminals u, v and w on the lines a, b and c and detects a load current <$i_s(t)$>($i_{sa}(t)$, $i_{sb}(t)$, $i_{sc}(t)$) flowing through the lines a, b and c.

A signal conversion means 120 has a first dq transformer 24 for dq transformation of the filter voltage <v(t)>($v_{ab}(t)$, $v_{bc}(t)$, $v_{ca}(t)$) detected by the voltage detection means 18, a low-pass filter 25 interposed between the first dq transformer 24 and the second adder 15 in the target current generation means 110 for removing a high-frequency component, a second dq transformer 26 for dq transformation of the load current <$i_s(t)$>($i_{sa}(t)$, $i_{sb}(t)$, $i_{sc}(t)$) detected by the second current detection means 7, and an inverse dq transformer 27 for inverse dq transformation of an output value <$j_{dq}(t)$> from the fourth adder 16 in the target current generation means 110 and outputting target current <j(t)>($j_a(t)$, $j_b(t)$, $j_c(t)$). In the case of a three-phase power conversion device, a first adder 20 calculates an error <Δ(t)>($Δ_a(t)$, $Δ_b(t)$, $Δ_c(t)$) between the output currents <$i_p(t)$>($i_{pa}(t)$, $i_{pb}(t)$, $i_{pc}(t)$) having three components and the target current <j(t)>($j_a(t)$, $j_b(t)$, $j_c(t)$) having three components and inputs it into the PWM control means 17.

In the target current generation means 110, the filter voltage command, the filter current command, and the deviation compensation command are generated by the filter voltage command means 10, the filter current command means 11, and the PWM current deviation compensation means 12, respectively, in the dq space, and the process up to inputting the output value <$j_{dq}(t)$> into the inverse dq transformer 27 is performed in the dq space. As the flow of operation, the difference from FIG. 22A and FIG. 22B is that a step of inputting the output value <$j_{dq}(t)$> into the inverse dq transformer 27 and outputting a target current <j(t)> ($j_a(t)$, $j_b(t)$, $j_c(t)$) is added between the calculation in the forth adder 16 (step S14') and the calculation in the first adder 20 (step S15). The processes are performed in the dq space for the convenience of operation.

The second current detection means 7, the first current detection means 19 and the voltage detection means 18 do not necessarily perform detection in all the three phases but have to perform detection in at least two phases. The brackets ( ) in FIG. 23 mean that the parts in the brackets can be omitted.

[Patent Document 1] JP-A-H05-316754 (Sections [0007] to [0014], FIGS. 1 to 6, etc.)

[Patent Document 2] JP-A-H06-217559 (Sections [0007] to [0013], FIGS. 1 to 7, etc.)

[Non-Patent Document 1] "Current Error Tracking Mode AC Current Waveform Control Method for Single-Phase Self Commutated Voltage Source Power Converters,"

Masaaki Ohshima, IEEJ Transactions on Industry Applications Vol. 114 (1994) No. 3, pp. 289–298.

[Non-Patent Document 2] "A novel Three-Phase UPS Inverter Driven by Error-Tracking-Mode PWM Scheme," Masaaki Ohshima, Fuminori Nakamura, Shinzo Tamai, Yuushin Yamamoto, Kouich Yoshida, IEEJ Transactions on Industry Applications Vol. 125 (2005) No. 2, pp. 164–173.

SUMMARY OF THE INVENTION

However, the conventional DC component suppression method using a saturable reactor or the like has a problem of slow response since the peak values of positive-negative asymmetric excitation current flowing through the saturable reactor and reactor are detected and excitation current value in one cycle is integrated in an integration circuit to detect a DC component proportional to the amount of magnetic saturation. Also, the accuracy in correcting of the DC component is difficult to improve because of the manufacturing variation of the saturable reactor and the reactor. In addition, a problem arises that since the saturable reactor and the reactor are large in size, the device is unavoidably large in size.

In the power conversion device employing an error tracking mode AC current control method, the current flowing to the load is controlled precisely. Therefore, there is no need for a large part such as a reactor, and quick response, high accuracy and downsizing of the device can be achieved. However, there has been found a problem that a DC component is generated by thermal drift of the current loop and so on when the power conversion device is operating, and the DC component is amplified by the control means and introduced into the output from the main circuit. In general, a transformer is provided between the main circuit and the load connected to the output terminals of the main circuit to achieve a voltage desired by the load. In such a case, when a DC component is contained in the output from the power conversion device, defects such as biased magnetization of the transformer can occur. Therefore, the DC component must be suppressed.

Here, the influence of a DC component in a single-phase power conversion device is described.

In a conventional device, the target current j(t) obtained in step S14' in FIG. 22A and FIG. 22B is expressed by Equation (1).

$$j(t)=\alpha(v_c(t)-v(t))+\beta i_S(t)+\gamma C_F(dv_c/dt)+D(t) \tag{1}$$

When a DC component $I_D$ is introduced into the target current j(t) expressed by Equation (1), it is expressed by the following equation.

$$j(t)=\alpha(v_C(t)-v(t))+\beta i_S(t)+\gamma C_F(dv_c/dt)+D(t)+I_D \tag{2}$$

When the above equation is expanded, Equation (3) is obtained.

$$j(t)=\alpha((v_C(t)+(I_D/\alpha))-v(t))+\beta i_S(t)+\gamma C_F(d/dt(v_C(t)+(I_D/\alpha)))+D(t) \tag{3}$$

Therefore, the influence of the DC component $I_D$ introduced into the target current j(t) is equivalent to biasing the filter voltage command $v_C(t)$ by $I_D/\alpha[V]$.

On the other hand, the filter voltage $v_0(t)$ at no load in a single-phase power conversion device is expressed by Equation (4).

$$(4) \quad v_0(t)=v_C(t)+R_FC_F(dv_C/dt)(t)$$

Since the target filter voltage $v_C(t)$ becomes $v_C(t)+I_D/\alpha$, the filter voltage $v_0(t)$ at no load is expressed by Equation (5).

$$v_0(t)=v_C(t)+R_FC_F(dv_c/dt)(t)+I_D/\alpha \tag{5}$$

After all, the DC component $V_D$ generated in the filter voltage $v_0(t)$ at no load is expressed by Equation (6).

$$V_D=I_D/\alpha[V] \tag{6}$$

As can be understood from Equation (6), the greater the feedback gain α, the better in view of suppression of DC component.

From above, it can be known how much the DC component $V_D$ in the output terminal voltage in a single-phase power conversion device is changed by the DC component $I_D$ in the target current j(t), that is, how much the target current j(t) must be changed to suppress the DC component $V_D$.

The influence of DC components in a three-phase conversion device can be estimated in the same manner as in a single-phase conversion device.

When DC components in target currents $j_a(t)$, $j_b(t)$ and $j_c(t)$ are represented as $I_{aD}$, $I_{bD}$ and $I_{cD}$ ($I_{aD}+I_{bD}+I_{cD}=0$), respectively, DC components $V_{abD}$, $V_{bCD}$ and $V_{caD}$ generated in the line voltages (output terminal voltages or filter voltages) $v_{ab}(t)$, $v_{bc}(t)$ and $v_{ca}(t)$ in the three-phase power conversion device are expressed by Equations (7a) to (7c), respectively.

$$V_{abD}=(I_{aD}-I_{bD})/\alpha \ [V] \tag{7a}$$

$$V_{bCD}=(I_{bD}-I_{cD})/\alpha \ [V] \tag{7b}$$

$$V_{caD}=(I_{cD}-I_{aD})/\alpha \ [V] \tag{7c}$$

FIG. 24 shows the result of an experiment in which DC components are added to the target currents in a three-phase power conversion device without measures for DC component suppression shown in FIG. 23. No load is applied in the experiment. Pulse signals (on-off signals) supplied to the gates of the semiconductor switch elements of the converter 2 are shown in the lower section, and the line voltages $V_{ab}(t)$, $v_{bc}(t)$ and $v_{ca}(t)$, and d-axis component $V_d$ and q-axis component $V_q$ obtained by dq transformation of the line voltages are shown in the upper section. The horizontal axis represents time (ms). The waveforms before the DC components were added are indicated by solid lines, and the waveforms after the DC components were added are indicated by dotted lines. As can be understood from FIG. 24, the DC component in the line voltage $v_{ab}(t)$ is biased to the positive side, and the DC component in the line voltage $v_{ca}(t)$ is biased to the negative side (the biased directions are indicated by arrows). The line voltage $v_{bc}(t)$ can be regarded as not being biased. Although the average of the $V_d$ component corresponds to the applied DC component $V_D$, 50 Hz components are generated in the $V_d$ and $V_q$ components.

It can be understood from above that correction to remove the DC components from the target currents for the three phases can suppress sufficiently the DC components in the line voltages in the power conversion device.

FIG. 25 shows an example of the waveform on the primary side of a transformer when a resistance load is connected as a load to the single-phase power conversion device shown in FIG. 21 via the transformer and the single-phase power conversion device is operated. In FIG. 25, the primary voltage v(t) of the transformer is shown in the upper section and the load current $i_s(t)$ is shown in the lower section. The horizontal axis represents time t. A sharp increase of current indicating magnetic saturation was observed obviously in the waveform of the load current $i_s(t)$, which indicates generation of biased magnetization. Therefore, a power conversion device employing an error tracking mode AC current control method has to be modified against biased magnetization.

Also, in the prior art, control for detecting biased magnetization of the transformer to prevent saturation of the transformer is difficult when a half-wave rectification load is connected in the load via a transformer. Since a situation in which a half-wave rectification load is connected in the load via a transformer can be caused by power failure or the like, measures against biased magnetization to prevent saturation of a transformer are required even when a half wave rectification load is connected.

An object of the present invention is to provide a quick-response, high-accuracy and small-size power conversion device which can suppress a DC component in AC power to be outputted therefrom without using a large part such as a reactor. Another object of the present invention is to provide a power conversion device which does not cause saturation of a transformer via which a half wave rectification load is connected in a load.

For the purpose of solving the above problem, the single-phase power conversion device according to claim 1 is, as shown in FIG. 1, for example, a single-phase power conversion device which produces single-phase AC power from DC power source 1 and supplies the power to a load 4 connected to output terminals u1 and u2 thereof, comprising: a converter 2 for converting the DC power from the DC power source 1 to single-phase AC power; an inductor 3 connected to the AC side of the converter 2; a current detection means 19 for detecting an output current $i_p(t)$ flowing through the inductor 3; a voltage detection means 18 for detecting an output terminal voltage v(t) applied across the output terminals u1 and u2; a target current generation means 110 for generating a target current j(t) as a target value for the output current $i_p(t)$; and a converter control means 17 for pulse width modulation control of the converter 2 based on an error Δ(t) between the output current $i_p(t)$ and the target current j(t); wherein the target current generation means 110 has a DC component suppression means 8 for suppressing a DC component in the single-phase AC power by amplifying an integral of the output terminal voltage v(t) detected by the voltage detection means 18 and using the amplified integral to correct the target current j(t).

Here the output terminal voltage v(t) which is the voltage applied across the output terminals, includes voltages essentially equivalent to it, such as the voltage applied to a filter circuit 5 connected to the output terminals. In this case, the filter circuit 5 may be located at any position on the lines connecting the output terminals u1 and u2 and the inductor 3 when there is not substantially anything that may influence the output terminal voltage v(t) on the lines connecting the output terminals u1 and u2 and the inductor 3. The DC component suppression means 8 of the target current generation means 110 may be physically located outside the target current generation means 110. Even when a transformer is connected as the load 4 and the lines are directly connected to a coil of transformer, there are assumed to be output terminals between the power conversion device and the transformer. In this configuration, the target current j(t) is generated by the target current generation means 110 and an integral of the output terminal voltage v(t) detected by the voltage detection means 18 is amplified and used to correct the target current j(t). Therefore, there can be provided a quick-response, high-accuracy and small-size power conversion device which can suppress the DC component in AC power to be outputted therefrom without using a large part such as a reactor.

The invention according to claim 2 is the single-phase power conversion device as set forth in claim 1, further comprising a filter circuit 5 for removing a switching frequency component in the single-phase AC power connected between the output terminals u1 and u2; wherein the voltage detection means 18 detects a filter voltage applied to the filter circuit 5 as the output terminal voltage v(t), and the DC component suppression means 8 amplifies an integral of the filter voltage v(t) and uses the amplified integral to correct the target current j(t).

The single-phase power conversion device according to claim 3 is, as shown in FIG. 7, for example, a single-phase power conversion device which produces single-phase AC power from DC power source 1 and supplies the power to a load 4 connected to output terminals u1 and u2, comprising: a converter 2 for converting the DC power from the DC power source 1 to single-phase AC power; an inductor 3 connected to the AC side of the converter 2; a current detection means 19 for detecting the output current $i_p(t)$ flowing through the inductor 3; a voltage detection means 18 for detecting the output terminal voltage v(t) applied across the output terminals u1 and u2; a target current generation means 110 for generating a target current j(t) as a target value for the output current $i_p(t)$; and a converter control means 17 for pulse width modulation control of the converter 2 based on an error Δ(t) between the output current $i_p(t)$ and the target current j(t); wherein the voltage detection means 18 has a DC voltage detection means 6 composed of a circuit of a capacitor $C_d$ and a resistance $R_d$ connected in series between the output terminals u1 and u2 for detecting a DC voltage component $V_D$ applied across the output terminals u1 and u2, and wherein the target current generation means 110 has a DC component suppression means 8 for suppressing the DC component in the single-phase AC power by correcting the target current j(t) based on the DC voltage component $V_D$.

In this configuration, the target current j(t) is generated by the target current generation means 110 and a DC voltage component applied across the output terminals detected by the DC voltage detection means 6 is used to correct the target current j(t). Therefore, there can be provided a quick-response, high-accuracy and small-size power conversion device which can suppress the DC component in AC power to be outputted therefrom without using a large part such as a reactor.

The invention according to claim 4 is the single-phase power conversion device as set forth in claim 3, as shown in FIG. 8, for example, wherein the DC component suppression means 8 has an amplification means 34 for amplifying the DC component detected by the DC voltage detection means 6, and a determination means 39 for determining the polarity of the voltage value of the DC component and outputting the voltage value with a sign based on the determination result.

The three-phase power conversion device according to claim 5 is, as shown in FIG. 3, a three-phase power conversion device which produces three-phase AC power from DC power source 1 and supplies the power to a load 4 connected to the output terminals u, v and w, comprising: a converter 2 for converting the DC power from the DC power source 1 to three-phase AC power; inductors 3 connected to the AC side of the converter 2; a current detection means 19 for detecting output current $<i_p(t)>(i_{pa}(t), i_{pb}(t), i_{pc}(t))$ flowing through the inductors 3; a voltage detection means 18 for detecting an output terminal voltage <v(t)>($v_{ab}(t)$, $v_{bc}(t)$, $v_{ca}(t)$) applied across the output terminals u, v and w; a target current generation means 110 for generating a target current <j(t)> as a target value for the output current <$i_p(t)$>($i_{pa}(t)$, $i_{pb}(t)$, $i_{pc}(t)$); and a converter control means 17 for pulse width modulation control of the converter 2 based on an error <Δ(t)>($Δ_a(t)$, $Δ_b(t)$, $Δ_c(t)$) between the output current <$i_p(t)$> and the target current <j(t)>($j_a(t)$, $j_b(t)$, $j_c(t)$); wherein the target current generation means 110 has a DC component suppression means 8 for suppressing a DC component in the three-phase AC power by amplifying an integral of the output terminal voltage <v(t)>($v_{ab}(t)$, $v_{bc}(t)$, $v_{ca}(t)$ detected by the voltage detection means 18 and using the amplified integral to correct the target current <j(t)>($j_a(t)$, $j_b(t)$, $j_c(t)$).

Here, in the case of a three-phase power conversion device, the three phases are symbolized according to the current, that is, the lines a, b and c. The terms "an output terminal voltage," "a filter voltage," "a load current," "an output current," "a target current", "an error", "the output terminal voltage," "the filter voltage," "the load current," "the output current," "the target current" and "the error" mean voltage or current having three components, and the terms "each output terminal voltage," "each filter voltage," "each load current," "each output current," "each target current", "errors", "output terminal voltages," "filter voltages," "load currents," "output currents," "target currents" and "errors" mean the component thereof. The filter circuit 5 may exist as a plurality of independent circuits between the lines or may be one circuit which is connected to the lines and which functions to remove switching frequency components between the lines, that is, between phases. The means in the DC component suppression means such as the integration means and multiplication means may exist as independent circuits or may be integrated or separated. In this configuration, there can be provided a quick-response, high-accuracy and small-size three-phase power conversion device which can suppress the DC component in AC power to be outputted therefrom without using a large part such as a reactor.

The invention according to claim 6 is the three-phase power conversion device as set forth in claim 5, as shown in FIG. 3, for example, further comprising a filter circuit 5 for removing a switching frequency component in the three-phase AC power connected between the output terminals u, v and w; wherein the voltage detection means 18 detects the filter voltage <v(t)>($v_{ab}(t)$, $v_{bc}(t)$, $v_{ca}(t)$) applied across connection points of the filter circuit 5 and lines a, b and c (across a and b, across b and c, across c and a) as the output terminal voltage, and wherein the DC component suppression means 8 amplifies an integral of the filter voltage <v(t)>($v_{ab}(t)$, $v_{bc}(t)$, $v_{ca}(t)$) and uses the amplified integral to correct the target current <j(t)>($j_a(t)$, $j_b(t)$ $j_c(t)$).

The three-phase power conversion device according to claim 7 is, as shown in FIG. 9, for example, a three-phase power conversion device which produces three-phase AC power from DC power source 1 and supplies the power to a load connected to output terminals u, v and w thereof, comprising: a converter 2 for converting the DC power from the DC power source 1 to three-phase AC power; inductors 3 connected to the AC side of the converter 2; a current detection means 19 for detecting the output current <$i_p(t)$> ($i_{pa}(t)$, $i_{pb}(t)$, $i_{pc}(t)$) flowing through the inductors 3; a voltage detection means 18 for detecting the output terminal voltage <v(t)>($v_{ab}(t)$, $v_{bc}(t)$, $v_{ca}(t)$) applied across the output terminals u, v and w; a target current generation means 110 for generating a target current <j(t)>($j_a(t)$, $j_b(t)$, $j_c(t)$) as a target value for the output current <$i_p(t)$>($i_{pa}(t)$, $i_{pb}(t)$, $i_{pc}(t)$); and a converter control means 17 for pulse width modulation control of the converter 2 based on an error <Δ(t)>($Δ_a(t)$, $Δ_b(t)$, $Δ_c(t)$) between the output current <$i_p(t)$>($i_{pa}(t)$, $i_{pb}(t)$, $i_{pc}(t)$) and the target current <j(t)>($j_a(t)$, $j_b(t)$, $j_c(t)$); wherein the voltage detection means 18 has a DC voltage detection means 6 composed of circuits of a resistance $R_d$ and a capacitor $C_d$ connected in series between the output terminals u, v and w for detecting DC voltage components $V_D(V_{abD}, V_{cbD})$ applied across the output terminals u, v and w, and wherein the target current generation means 110 has a DC component suppression means 8 for suppressing a DC component in the three-phase AC power by correcting the target current <j(t)>($j_a(t)$ $j_b(t)$, $j_c(t)$) based on the DC voltage components $V_D(V_{abD}, V_{cbD})$.

In this configuration, there can be provided a quick-response, high-accuracy and small-size three-phase power conversion device which can suppress the DC component in AC power to be outputted therefrom without using a large part such as a reactor.

The invention according to claim 8 is the three-phase power conversion device as set forth in claim 7, as shown in FIG. 10, for example, wherein the DC component suppression means 8 has an amplification means 34a and 34b for amplifying two DC components $V_D(V_{abD}, V_{cbD})$ detected by the DC component detection means 6, a first addition means 37a for adding a double of a first DC component $V_{abD}$ and a second DC component $V_{cbD}$, a second addition means 37b for adding the first DC component $V_{abD}$ and a double of the second DC component $V_{cbD}$, a first determination means 39a for determining the polarity of the voltage value obtained in the first addition means 37a and outputting the voltage value with a sign based on the determination result, and a second determination means 39b for determining the polarity of the voltage value obtained in the second addition means 37b and outputting the voltage value with a sign based on the determination result.

For the purpose of solving the above problem, a single-phase power conversion device according to claim 9 is, as shown in FIG. 11, a single-phase power conversion device which produces single-phase AC power from DC power source 1 and supplies the power to a load 4 connected to output terminals u1 and u2 thereof, comprising: a converter 2 for converting the DC power from the DC power source 1 to single-phase AC power; an inductor 3 connected to the AC side of the converter 2; a first current detection means 19 for detecting an output current $i_p(t)$ flowing through the inductor 3; a second current detection means 7 for detecting a load current $i_s(t)$ being supplied to the load 4; a target current generation means 110 for generating a target current j(t) as a target value for the output current $i_p(t)$; and a converter control means 17 for pulse width modulation control of the converter 2 based on an error Δ(t) between the output current $i_p(t)$ and the target current j(t); wherein the target current generation means 110 has a DC component suppression means 8 for suppressing a DC component in the single-phase AC power by correcting the target current j(t) based on asymmetry of the load current $i_s(t)$ detected by the second current detection means 7.

In this configuration, the target current j(t) is generated by the target current generation means 110 and the target current j(t) is corrected based on the asymmetry of the load current $i_s(t)$ detected by the second current detection means 7. Therefore, there can be provided a quick-response, high-accuracy and small-size power conversion device which can suppress the DC component in AC power to be outputted therefrom without using a large part such as a reactor. Also, even when a half wave rectification load is connected in the load 4 via a transformer, biased magnetization of the transformer can be prevented by applying a correction current in such a direction as to suppress the asymmetric current.

The invention according to claim 10 is the single-phase power conversion device as set forth in claim 9, as shown in FIG. 16, for example, wherein the DC component suppression means 8 calculates a correction amount $j_h(t)$ for correcting the target current $j(t)$ from the difference between a first instantaneous value d1 of the load current $i_s(t1)$ at a first time point t1 and a second instantaneous value d2 of the load current $i_s(t2)$ at a second time point t2 that is approximately a half cycle after the first time point t1.

Here, approximately a half cycle after the first time point means that it is not necessarily exactly a half cycle after the first time point and a small difference is allowed. The correction amount $j_h(t)$ may be calculated from an average of a plurality of differences between first instantaneous values d1 and second instantaneous values d2. The correction amount $j_h(t)$ may be a value proportional to the difference between instantaneous values or a fixed value. In this configuration, since asymmetry of the load current $i_s(t)$ can be detected within a half cycle of the AC power, the response concerning the DC component suppression can be quick.

The invention according to claim 11 is the single-phase power conversion device as set forth in claim 9, as shown in FIG. 19, for example, wherein the DC component suppression means 8 calculates a correction amount $j_h(t)$ for correcting the target current $j(t)$ from the difference between a positive peak value $d_p1$ and a negative peak value $d_p2$ of the load current $j_s(t)$ in an arbitrary cycle.

Here, the difference between the peak values may be obtained every cycle or once in a plurality of cycles. Alternatively, the difference between the peak values may be obtained when one or both of the peak values exceed a threshold value. The correction amount $j_h(t)$ may be a value proportional to the difference between the peak values or a fixed value. In this configuration, asymmetry of the load current $i_s(t)$ can be detected with high accuracy, and the DC component can be suppressed easily.

For the purpose of solving the above problem, the three-phase power conversion device according to claim 12 is, as shown in FIG. 20, a three-phase power conversion device which produces three-phase AC power from DC power source 1 and supplies the power to a load 4 connected to the output terminals u, v and w, comprising: a converter 2 for converting the DC power from the DC power source 1 to three-phase AC power; inductors 3 connected to the AC side of the converter 2; a first current detection means 19 for detecting the output current $<i_p(t)>(i_{pa}(t), i_{pb}(t), i_{pc}(t))$ flowing through the inductors 3; a second current detection means 7 for detecting the load current $<i_s(t)>(i_{sa}(t), i_{sb}(t), i_{sc}(t))$ being supplied to the load 4; a target current generation means 110 for generating a target current $<j(t)>(j_a(t), j_b(t), j_c(t))$ as a target value for the output current $<i_p(t)>(i_{pa}(t), i_{pb}(t), i_{pc}(t))$; and a converter control means 17 for pulse width modulation control of the converter 2 based on an error $<\Delta(t)>(\Delta_a(t), \Delta_b(t), \Delta_c(t))$ between the output current $<i_p(t)>$ and the target current $<j(t)>$; wherein the target current generation means 110 has a DC component suppression means 8 for suppressing the DC component in the three-phase AC power by correcting the target current $<j(t)>$ based on asymmetry of the load current $<i_s(t)>$ detected by the second current detection means 7.

In this configuration, there can be provided a quick-response, high-accuracy and small-size three-phase power conversion device which can suppress the DC component in AC power to be outputted therefrom without using a large part such as a reactor. Also, even when a half wave rectification load is connected in the load 4 via a transformer, biased magnetization of the transformer can be prevented.

The invention according to claim 13 is the three-phase power conversion device as set forth in claim 12, as shown in FIG. 16, for example, wherein the DC component suppression means 8 calculates a correction amount $<j_h(t)>(j_{ha}(t), j_{hb}(t), j_{hc}(t))$ for correcting the target current $<j(t)>$ from the differences between first instantaneous values d1 of the load current $<i_s(t)>$ at a first time point t1 and second instantaneous values d2 of the load current $<i_s(t)>$ at a second time point t2 that is approximately a half cycle after the first time point t1 detected in at least two phases.

Here, when the load currents in first and second phases can be known, the load current in the third phase can be obtained. Therefore, when the load currents in at least two phases are detected, the correction amount can be calculated. In this configuration, since asymmetry of the load current $<i_s(t)>$ can be detected within a half cycle of the AC power in a three-phase power conversion device, the response concerning the DC component suppression can be quick.

The invention according to claim 14 is the three-phase power conversion device as set forth in claim 12, as shown in FIG. 19, for example, wherein the DC component suppression means 8 calculates a correction amount $<j_h(t)>$ for correcting the target current $<j(t)>$ from the differences between positive peak values $d_p1$ and negative peak values $d_p2$ of the load current $<i_s(t)>$ detected in at least two phases in an arbitrary cycle.

In this configuration, asymmetry of the load current $<i_s(t)>$ can be detected with high accuracy in a three-phase power conversion device, and DC components can be suppressed easily.

According to the present invention, a target current is generated by a target current generation means and the target current is corrected based on the asymmetry of the load current detected by the second current detection means. Therefore, there can be provided a quick-response, high-accuracy and small-size power conversion device which can suppress a DC component in AC power to be outputted therefrom without using a large part such as a reactor. According to a preferred embodiment of the present invention, even when a half wave rectification load is connected in the load via a transformer, biased magnetization of the transformer can be prevented by applying correction current in such a direction as to suppress the asymmetric current.

This application is based on the Patent Applications No. 2005-070118 filed on Mar. 11, 2005 in Japan and the Patent Applications No. 2005-164588 filed on Jun. 3, 2005 in Japan, the contents of which are hereby incorporated in its entirety by reference into the present application, as part thereof.

The present invention will become more fully understood from the detailed description given hereinbelow. Further practical applications will be clear from the detailed description given hereinbelow. However, the detailed description and the specific embodiment are illustrated of desired embodiments of the present invention and are described only for the purpose of explanation. Various changes and modifications in the scope and spirit of present invention will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 22B shows an example of the process flow of the control of the power conversion in the single-phase power conversion device without measures for DC component suppression.

DETAILED DESCRIPTION OF THE PREFERRED EMBODIMENTS

The embodiments of the present invention are hereinafter described with reference to the drawings.

First Embodiment

Figure 1:
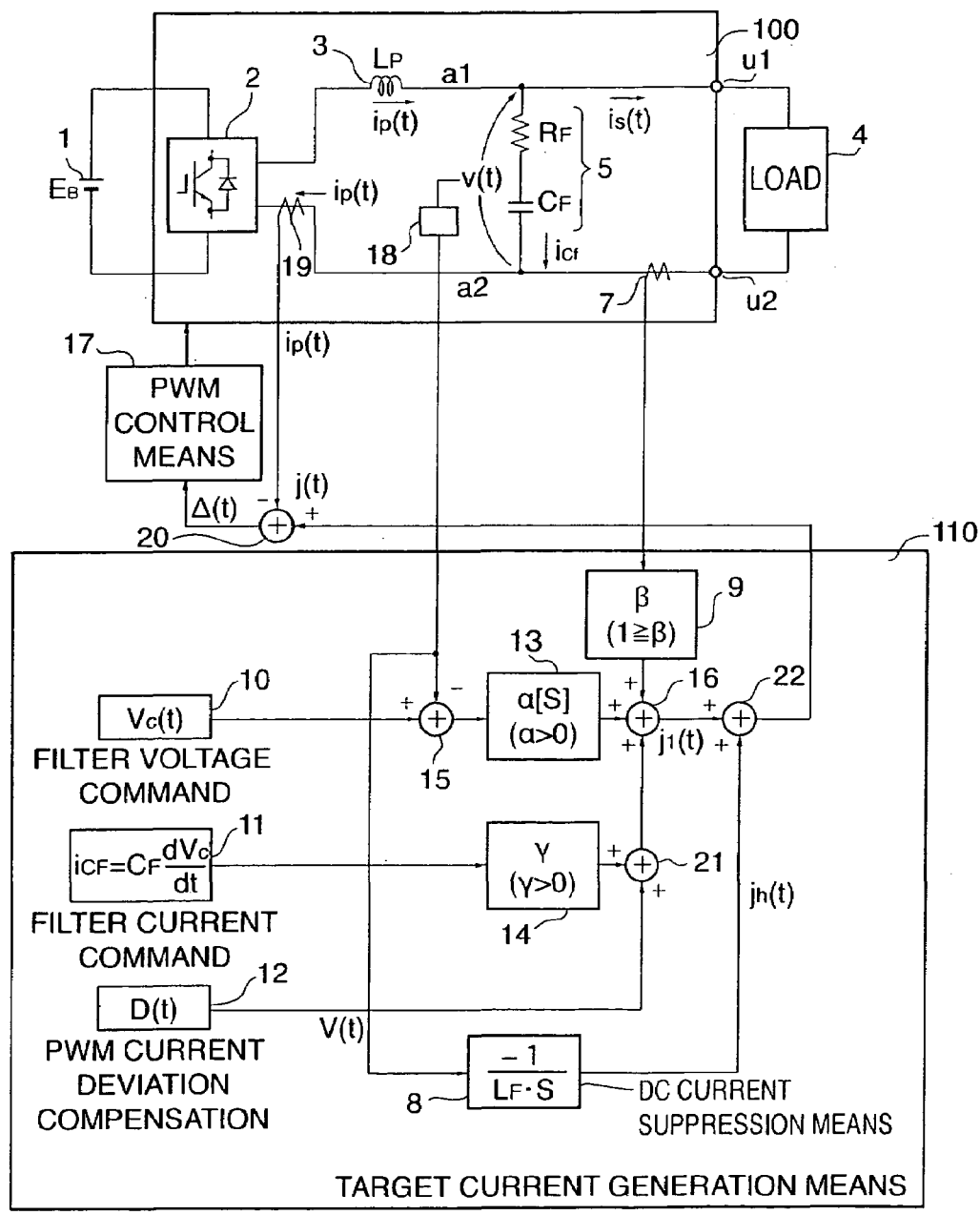
FIG. 1 shows an example of the circuit configuration of a single-phase power conversion device according to a first embodiment.
Figure 21:
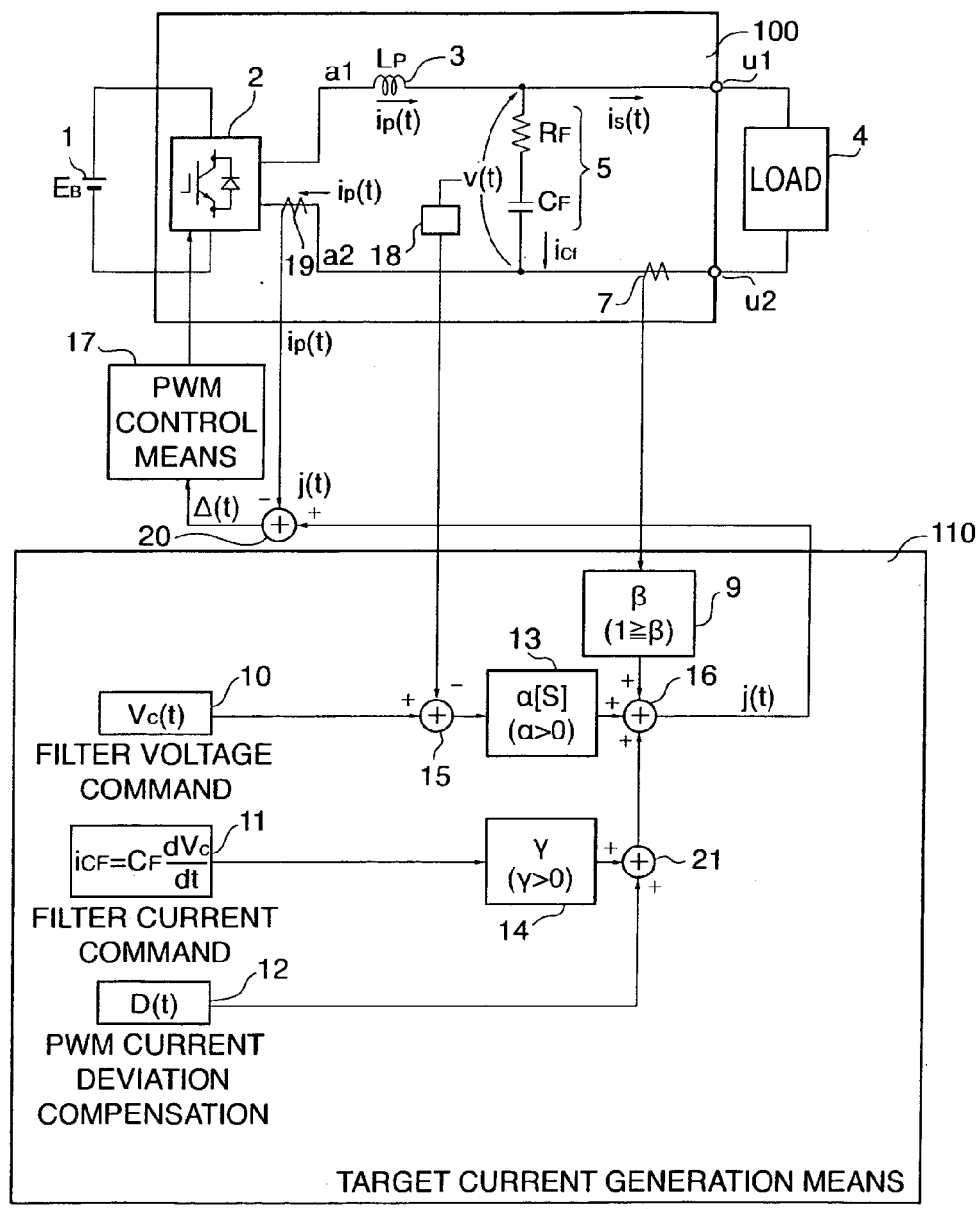
FIG. 21 shows an example of the circuit configuration of a single-phase power conversion device without measures for DC component suppression.

FIG. 1 shows an example of the circuit configuration of a single-phase power conversion device according to a first embodiment of the present invention. Those parts having the same functions as those in FIG. 21 are designated in FIG. 1 by the same reference numerals. The differences from the device shown in FIG. 21 are that the output from the fourth adder 16 is changed from "target current" to "first target current $j_r(t)$," and that a DC component suppression means 8 for receiving a filter voltage v(t) as a detection signal from the voltage detection means 18 and calculating a correction amount $j_h(t)$ for a target current j(t) and a fifth adder 22 for adding the correction amount $j_h(t)$ to the first target current $j_t(t)$ and outputting the target current j(t) to a first adder 20 are added in the target current generation means 110. The correction is carried out to suppress a DC component $V_D$ in the filter voltage v(t), that is, the output terminal voltage.

That is, the power conversion device according to this embodiment is a single-phase power conversion device which produces single-phase AC power from a DC power source 1 and supplies the power to a load 4 connected to output terminals u1 and u2 thereof, and has a converter 2 for converting the DC power from the DC power source 1 to single-phase AC power, an inductor 3 connected to the AC side of the converter 2, a first current detection means 19 for detecting an output current $i_p(t)$ flowing through the inductor 3, a voltage detection means 18 for detecting an output terminal voltage v(t) applied across the output terminals u1 and u2, a target current generation means 110 for generating a target current j(t) as a target value for the output current $i_p(t)$, and a converter control means 17 for pulse width modulation control of the converter 2 based on an error $\Delta(t)$ between the output current $i_p(t)$ and the target current j(t). The target current generation means 110 has a DC component suppression means 8 for suppressing a DC component in the single-phase AC power by correcting the target current j(t) based on an integral of the output terminal voltage v(t) detected by the voltage detection means 18.

A feature of the suppression of the DC component in this embodiment is that a value obtained by multiplying an integral of the detected output terminal voltage v(t) by a gain $1/L_F$ is added as a correction amount $j_h(t)$ for correcting the DC component to the target current j(t) (substantially subtract the correction amount $j_h(t)$ from the first target current $j_t(t)$), and an error $\Delta(t)$ between the target current j(t) and the output current is inputted into a PWM control means 17, and the converter 2 is controlled based on an error $\Delta(t)$. In the integration, sampled values may be accumulated in a digital manner or the voltage value may be integrated in an analog manner. The DC component $V_D$ can be suppressed by adding the correction amount $j_h(t)$ to the first target current $j_t(t)$ (substantially subtracting the correction amount $j_h(t)$ from the first target current $j_t(t)$)) as described above.

In this configuration, there can be provided a quick-response, high-accuracy and small-size power conversion device which can suppress the DC component in the AC power to be outputted therefrom without using a large part such as a reactor.

A filter circuit 5 is composed of a circuit of a capacitor $C_F$ and a resistance $R_F$ connected in series, and the voltage detection means 18 detects a filter voltage applied across the connection points of the filter circuit 5 and lines a1 and a2 as an output terminal voltage v(t). A second current detection means 7 for detecting a load current $i_s(t)$ flowing to the load 4 is provided. The target current generation means 110 has a filter voltage command means 10 for generating a filter voltage command $v_C(t)$ as a target value for the filter voltage v(t), a filter current command means 11 for generating a filter current command $i_{CF}(=C_F(dv_C/dt))$ as a target value for a filter current $i_{Cf}$ flowing through the capacitor $C_F$, and a current deviation compensation means 12 for generating a deviation compensation command D(t) to compensate for the current deviation between an output current $i_p(t)$ and the target current j(t), and calculates a target current j(t) based on the filter voltage command $v_C(t)$, the filter current command $i_{CF}$, the deviation compensation command D(t), and the correction amount $j_h(t)$. The PWM control means 17 (converter control means) supplies on-off signals to a plurality of semiconductor switch elements based on the error $\Delta(t)$. Here, the second current detection means 7, the filter current command $i_{CF}$, and the deviation compensation command D(t) may be omitted. In this embodiment, the resistance $R_F$ may be omitted from the filter circuit 5.

The target current generation means 110 also has a second adder 15 for performing subtraction between a filter voltage v(t) detected by the voltage detection means 18 and the filter voltage command $v_C(t)$, a first amplifier 13 for amplifying an error outputted from the second adder 15 by $\alpha$ times, a second amplifier 9 for amplifying the load current $i_s(t)$ detected by the first current detection means 7 by $\beta$ times, a third amplifier 14 for amplifying the filter current command $i_{CF}$ by $\gamma$ times, a third adder 21 for performing addition of an output signal from the third amplifier 14 and the deviation compensation command D(t), a fourth adder 16 for calculating a first target current $j_t(t)$ by adding an output signal from the first amplifier 13, an output signal from the second amplifier 9 and an output signal from the third adder 21, and a fifth adder 22 for calculating a target current j(t) by adding the correction amount $j_h(t)$ to the first target current $j_t(t)$ and supplying it to the first adder 20. The power conversion device has the first adder 20, for performing subtraction between an output current $i_p(t)$ detected by the first current detection means 19 and the target current j(t) and supplying the difference therebetween to the converter control means 17 as an error $\Delta(t)$, outside the target current generation means 110.

Figure 2A:
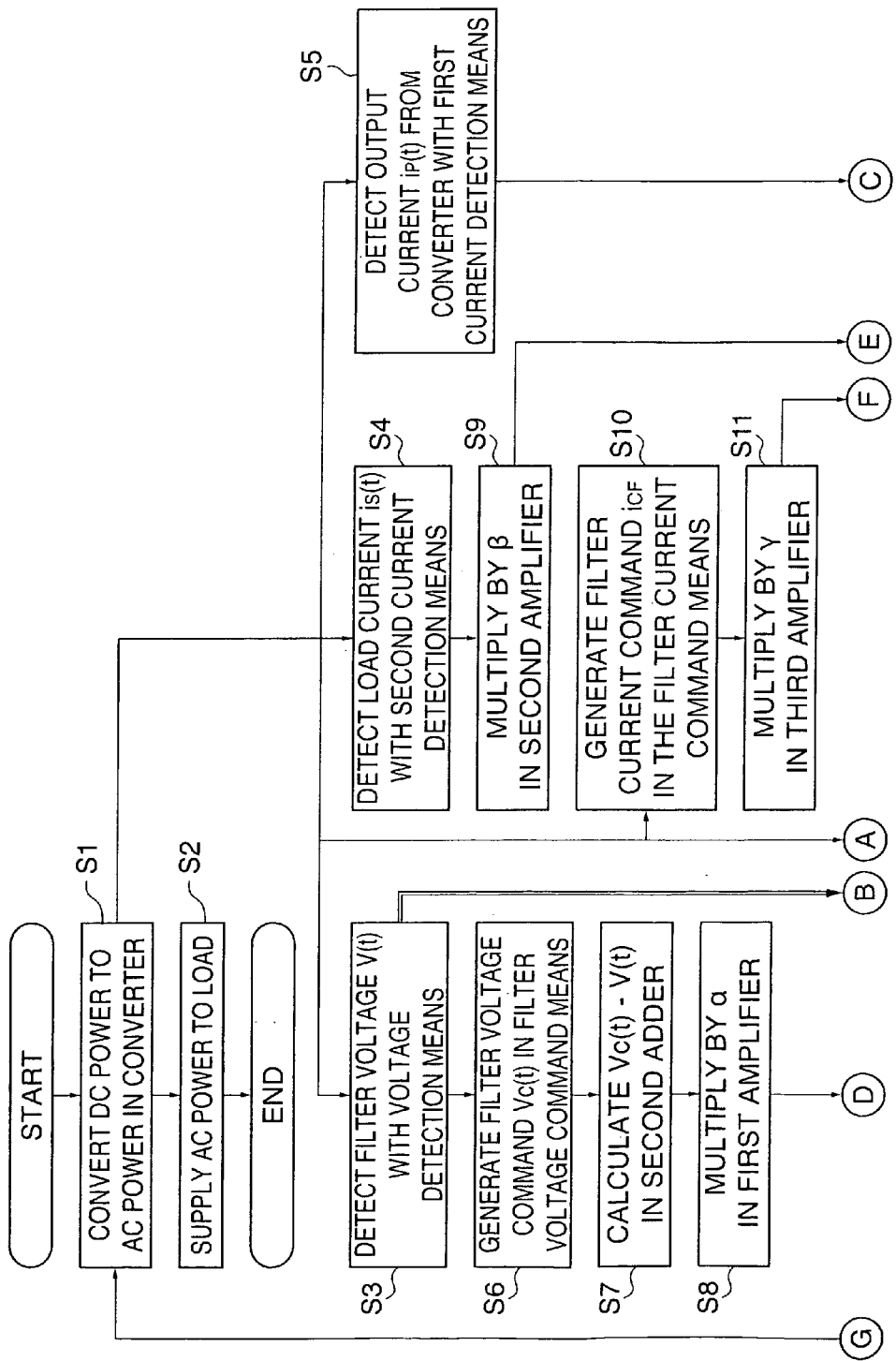
FIG. 2A shows an example of a process flow of the DC component suppression method in the power conversion device according to the first embodiment.
Figure 2B:
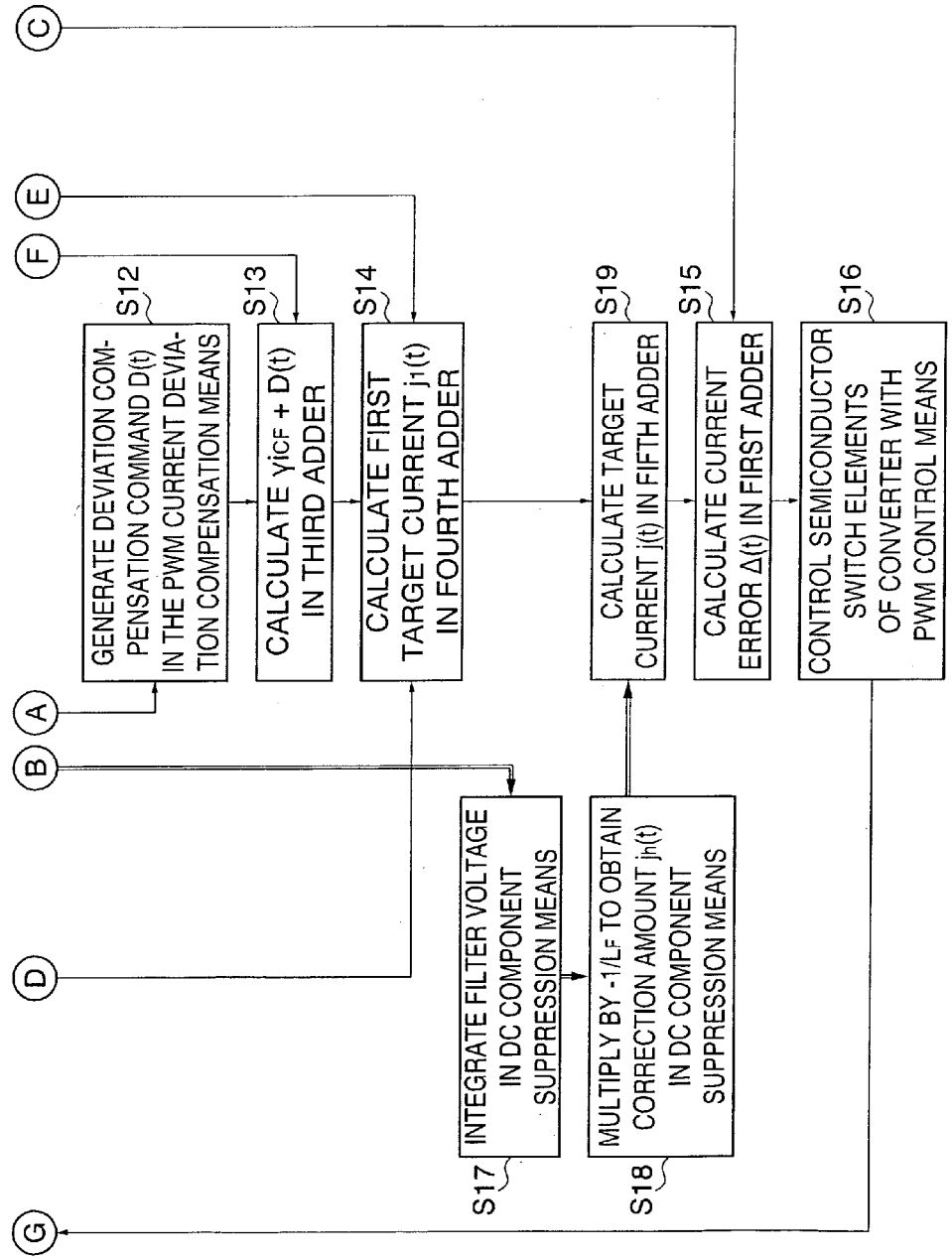
FIG. 2B shows an example of a process flow of the DC component suppression method in the power conversion device according to the first embodiment.
Figure 22A:
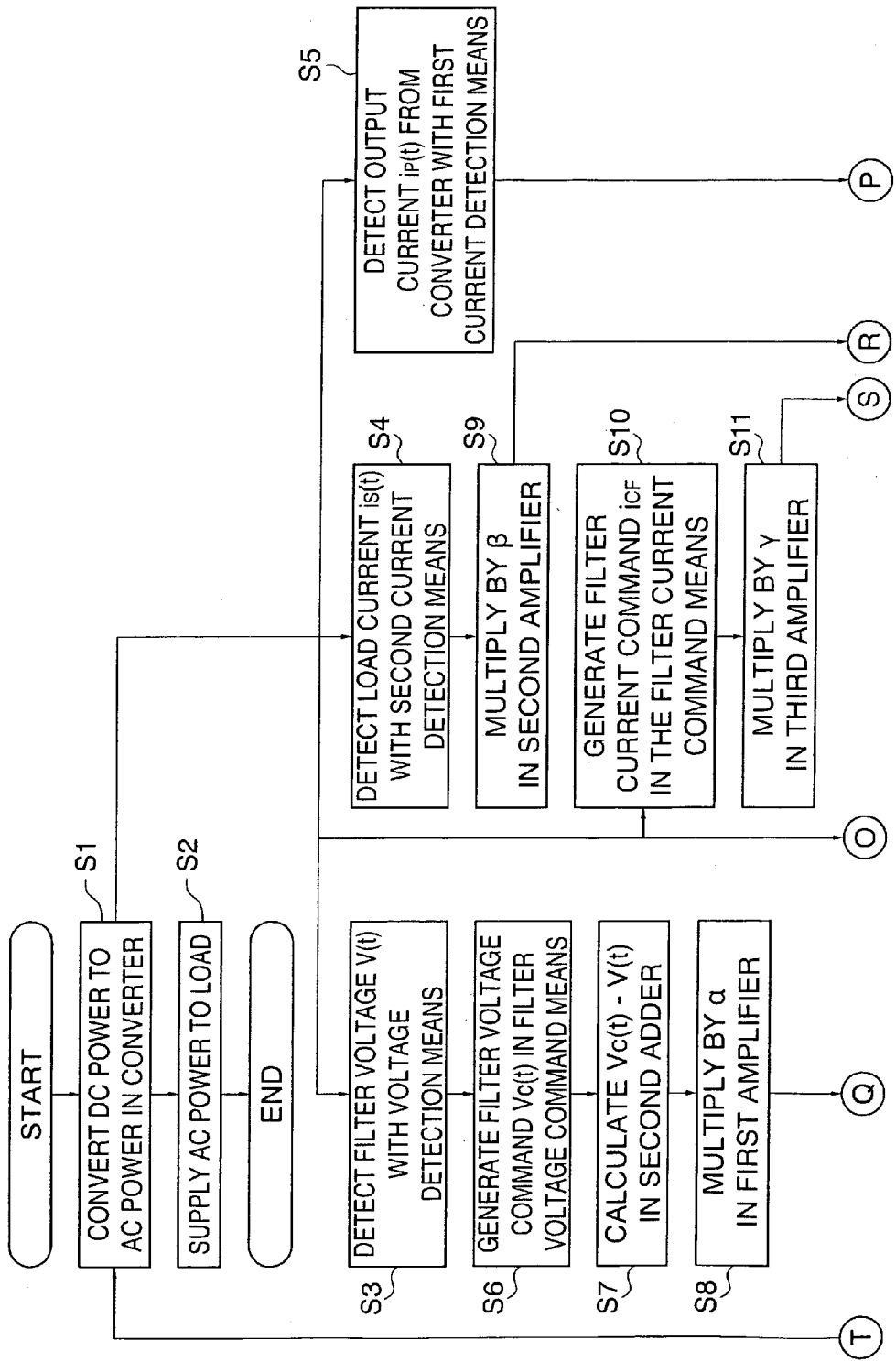
FIG. 22A shows an example of the process flow of the control of the power conversion in the single-phase power conversion device without measures for DC component suppression.

FIG. 2A and FIG. 2B show an example of a process flow of the DC component suppression method in the power conversion device according to this embodiment. First, the steps added to the flowchart shown in FIG. 22A and FIG. 22B are described, and redundant explanation is omitted. The added flows are shown in double lines in the drawing. In order to suppress the DC component generated in the filter voltage v(t), in the DC component suppression means 8, the filter voltage v(t) detected by the voltage detection means 18 is integrated (step S17), and the obtained integral is multiplied by a gain $(-1/L_F)$ to obtain a correction amount $j_h(t)$ (step S18). That is, the AC component is cancelled by integrating the filter voltage v(t) detected by the voltage detection means 18 to extract the DC component. The correction amount $j_h(t)$ is expressed by Equation (8a), and, when $j_h(t)$ is converted to a function with the Laplace operator s as a variable, it is expressed by Equation (8b). The correction amount $j_h(t)$ is added to the first target current $j_t(t)$ in the fifth adder 22, and a target current j(t) is outputted from the fifth adder 22 (step S19).

$$j_h(t) = (-1/L_F) \cdot \int_0^T v(t)\,dt \tag{8a}$$

$$j_h(s) = -v(s)/L_F \cdot s \tag{8b}$$

Here, $L_F$ is the reciprocal of the gain, and has the dimensions of an inductance. When a transformer is connected to the load 4, the value of $L_F$ must be smaller than the excitation inductance of the transformer, and greater than a specific value in order to prevent resonance with the filter circuit 5. Although the value of $L_F$ cannot be specifically determined since it varies depending on the configuration of the main circuit, operating conditions of the power conversion device, load conditions and so on, since $\alpha \cdot L^F$ can be a time constant for suppression of DC component, the value of the gain $1/L_F$ is preferably so set that the value of $\alpha \cdot L_F$ can be approximately 0.01 to 1 seconds from the viewpoint of the tolerance against biased magnetization of the transformer.

That is, the DC component suppression method in a power conversion device according to this embodiment is a DC component suppression method in a power conversion device which converts DC power to supply AC power and includes a conversion step of converting DC power to AC power in a converter 2 (step S1), a power supply step of supplying the AC power to a load 4 (step S2), a voltage detection step of detecting an output terminal voltage v(t) applied across output terminals u1 and u2 (step S3), a current detection step of detecting an output current $i_p(t)$ flowing from the converter 2 to an inductor 3 on a line (step S5), a target current generation step of outputting a target current j(t) as a target value for the output current $i_p(t)$ (step S14), and a converter control step of controlling the converter 2 based on an error $\Delta(t)$ between the output current $i_p(t)$ and the target current j(t) (step S16). The target current generation step (step S14) includes correction amount calculation steps of calculating a correction amount $j_h(t)$ for the target current j(t) based on a detection signal detected in the voltage detection step to suppress a DC component in the AC power (steps S17 to S18), and a correction step of correcting the target current j(t) using the correction amount $j_h(t)$ (step S19).

In this configuration, the DC component in the AC power to be outputted from the power conversion device can be suppressed.

Second Embodiment

A three-phase power conversion device as a second embodiment of the present invention is next described. The approach for suppression of DC component in a three-phase power conversion device is basically the same as that in a single-phase power conversion device. In the case of a three-phase power conversion device, correction amounts $j_{ha}(t)$ $j_{hb}(t)$, and $j_{hc}(t)$ are calculated for correction of three target currents $j_a(t)$ $j_b(t)$, and $j_c(t)$, respectively, and a DC component suppression approach similar to that for a single-phase power conversion device is applicable.

In the three-phase power conversion device, voltage detection means 18 detect line voltages $v_{ab}(t)$, $v_{bc}(t)$ and $v_{ca}(t)$ across three output terminals u, v and w the output terminal voltage v(t). The output current $i_p(t)$ detected by first current detection means 19 has three components $i_{pa}(t)$, $i_{pb}(t)$ and $i_{pc}(t)$, and the load current $i_s(t)$ detected by second current detection means 7 has three components $i_{sa}(t)$, $i_{sb}(t)$ and $i_{sc}(t)$. The target current generation means 110 processes the three components.

Figure 3:
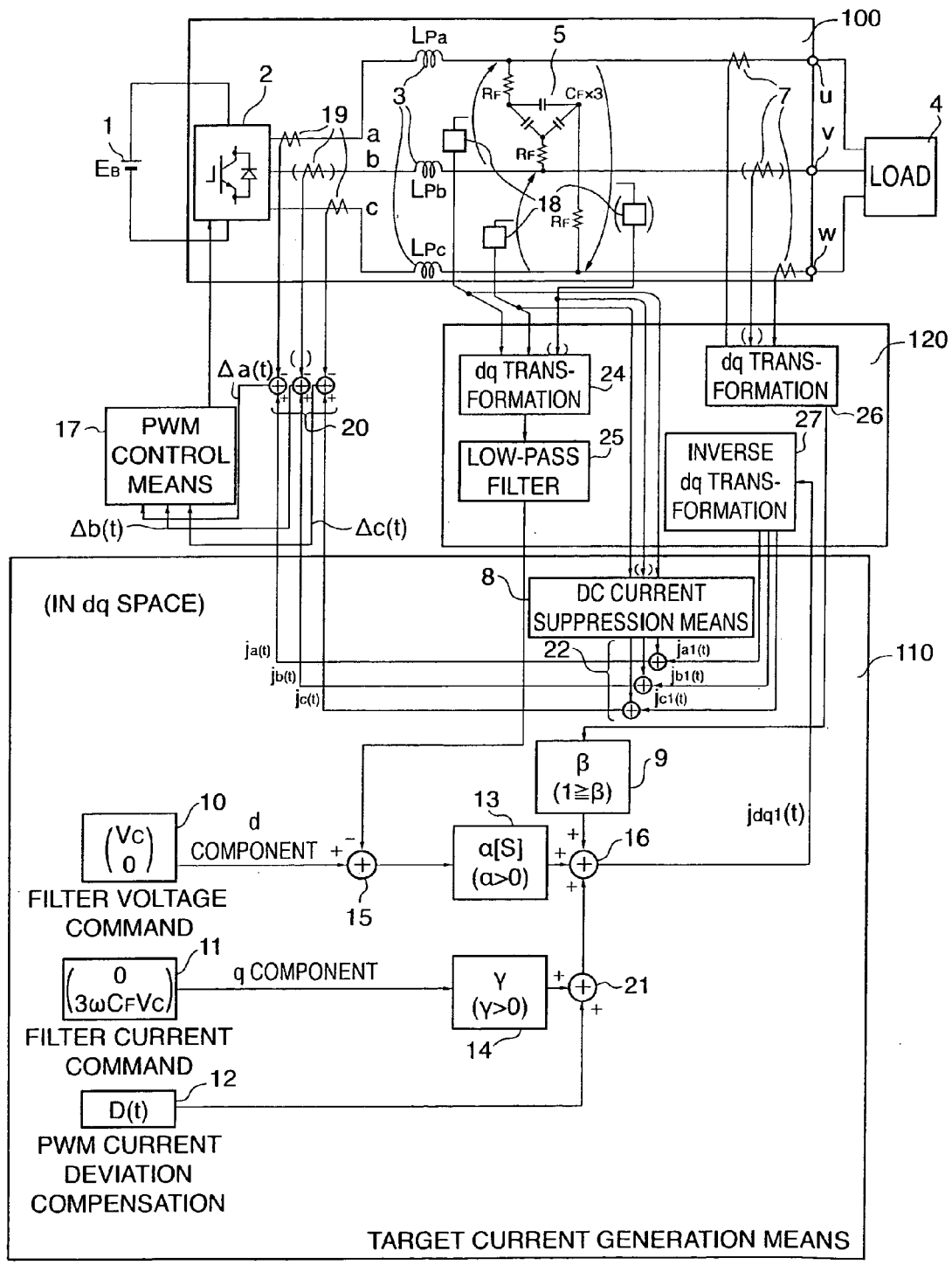
FIG. 3 shows an example of the circuit configuration of a three-phase power conversion device according to a second embodiment.
Figure 23:
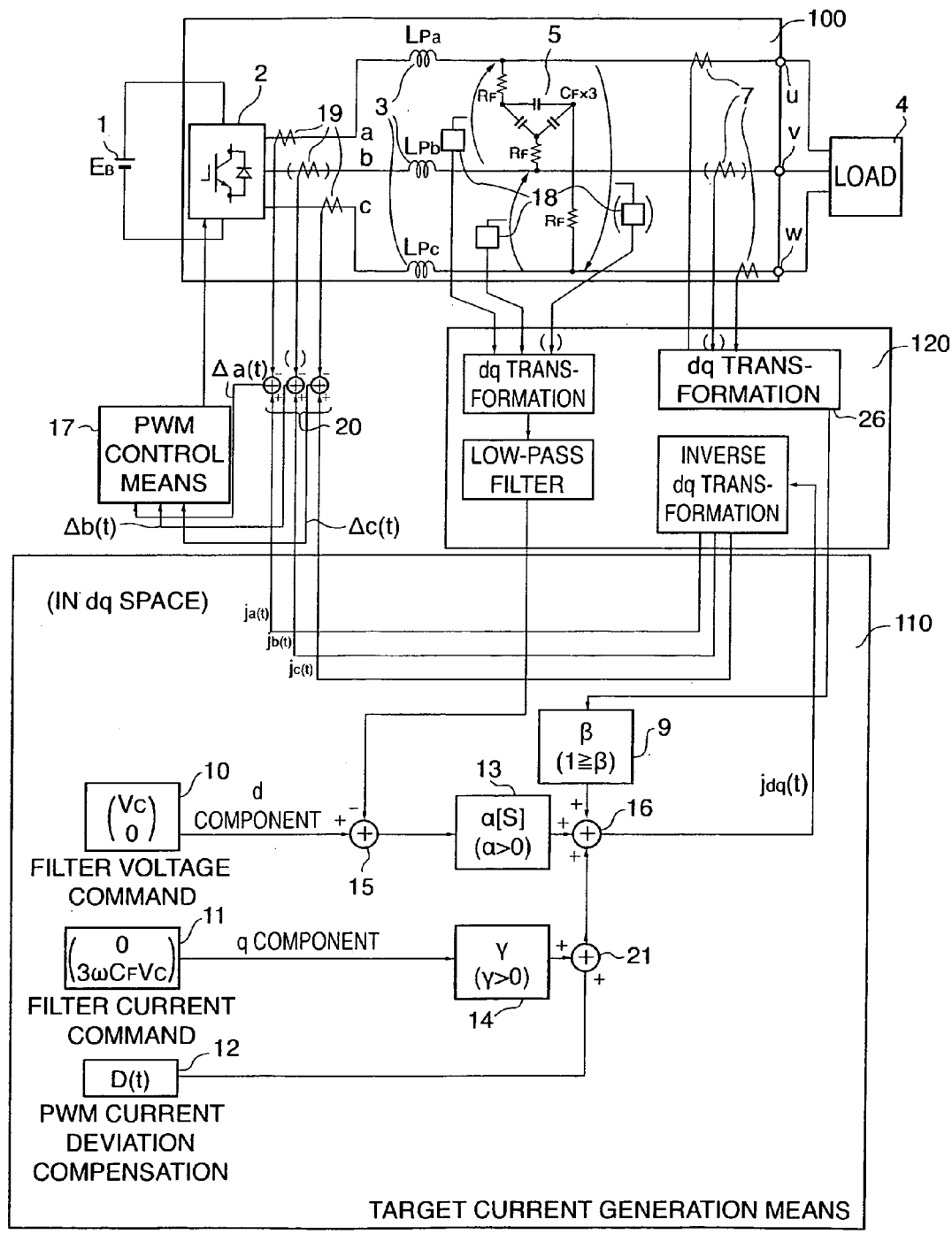
FIG. 23 shows an example of the circuit configuration of a three-phase power conversion device without measures for DC component suppression.

FIG. 3 shows an example of the circuit configuration of a three-phase power conversion device according to the second embodiment. Those parts having the same functions as those in FIGS. 1 and 23 are designated in the drawing by the same reference numerals, and the differences are mainly described. The device shown in FIG. 3 is different from the device shown in FIG. 23 in that a DC component suppression means 8 and a fifth adder 22 are located on the output side of the inverse dq transformer 27 in the target current generation means 110. Also, "the target current $<j_{dq}(t)>$" in the dq space outputted from the fourth adder 16 is changed to "a first target current $<j_{dq1}(t)>(j_{d1}(t), j_{q1}(t))$", and "the target current $<j(t)>$" outputted from the inverse dq trans former 27 as a result of inverse dq transformation therein is changed to a "first target current $<j_1(t)>(j_{a1}(t), j_{b1}(t), j_{c1}(t))$". The signal conversion means 120 has the same function as that in FIG. 23. When receiving an output terminal voltage $<v(t)>$ detected by the voltage detection means 18, the DC component suppression means 8 calculates a correction amount $<j_h(t)>$ for the target current and inputs it into the fifth adder 22, which in turn adds the correction amount $<j_h(t)>$ to the first target current $<j_1(t)>$ outputted from the inverse dq transformer 27 and outputs a target current $<j(t)>$. The second embodiment is different from the first embodiment (see FIG. 1) in that the target current j(t) has three components and that arithmetic processing is performed in the dq space in the target current generation means 110 and so on for convenience of calculation. The brackets ( ) in FIG. 3 means that the parts in the brackets can be omitted.

That is, the power conversion device according to this embodiment is a three-phase power conversion device which produces three-phase AC power from a DC power source 1 and supplies the power to a load 4 connected to output terminals u, v and w thereof, and has a converter 2 for converting the DC power from the DC power source 1 to three-phase AC power, inductors 3 connected to the AC side of the three-phase converter 2, a first current detection mean 19 for detecting an output current $<i_p(t)>(i_{pa}(t), i_{pb}(t), i_{pc}(t))$ flowing through the inductors 3, a voltage detection means 18 for detecting an output terminal voltage $<v(t)>(v_{ab}(t), v_{bc}(t)$ $v_{ca}(t)$ a target current generation means 110 forgenerating a target current $<j(t)>(j_a(t), j_b(t), j_c(t))$ as a target value for the output current $<i_p(t)>(i_{pa}(t), i_{pb}(t), i_{pc}(t))$, and a PWM control means 17 (converter control means) for pulse width modulation control of the converter 2 based on an error $<\Delta(t)>(\Delta_a(t), \Delta_b(t), \Delta_c(t))$ between the output current $<i_p(t)>$ and the target current $<j(t)>$. The target current generation means 110 has a DC component suppression means 8 for suppressing a DC component in three-phase AC power by correcting the target current $<j(t)>(j_a(t), j_b(t), j_c(t))$ based on an integral of the output terminal voltage $<v(t)>$ $(v_{ab}(t), v_{bc}(t), v_{ca}(t))$ detected by the voltage detection means 18.

In this configuration, there can be provided a quick-response, high-accuracy and small-size three-phase power conversion device which can suppress the DC component in the AC power to be outputted therefrom without using a large part such as a reactor.

A filter circuit 5 has a circuit of three capacitors $C_F$ connected in a delta configuration and resistances $R_F$ interposed between the three terminals of the delta configuration and the lines (a, b and c), and the voltage detection means 18 detect filter voltages applied across the connection points of the filter circuit 5 and lines a, b and c as the output terminal voltage v(t). A second current detection means 7 for detecting a load current $<i_s(t)>$ flowing to the load 4 is provided. The target current generation means 110 has a filter voltage command means 10 for generating a filter voltage command $v_C(t)$ as a target value for the filter voltage $<v(t)>$, a filter current command means 11 for generating a filter current command $i_{CF}$ as a target value for a filter current flowing through the capacitor $C_F$, and a current deviation compensation means 12 for generating a deviation compensation command D(t) to compensate for the current deviation between an output current $<i_p(t)>$ and the target current $<j(t)>$, and calculates a target current $<j(t)>$ based on the filter voltage command $v_C(t)$, the filter current command $i_{CF}$, the deviation compensation command D(t), and the correction amount $<j_h(s)>$. The PWM control means 17 supplies on-off signals to a plurality of semiconductor switches based on the error <Δ(t)>.

The target current generation means 110 has a second adder 15 for performing subtraction between the output terminal voltage <v(t)> outputted from the voltage detection means 18 via a first dq transformer 24 and the filter voltage command $v_C(t)$, a first amplifier 13 for amplifying an error <Δ(t)> outputted from the second adder 15 by α times, a second amplifier 9 for amplifying the load current <$i_s(t)$> outputted from the second dq transformer 26 by β times, a third amplifier 14 for amplifying the filter current command $i_{CF}$ by γ times, a third adder 21 for performing addition of the deviation compensation command D(t) and an output signal from the third amplifier 14, a fourth adder 16 for calculating a first target current <$j_{dq1}(t)$> in the dq space by adding an output signal from the first amplifier 13, an output signal from the second amplifier 9 and an output signal from the third adder 21 and outputting it to the inverse dq transformer 27, and a fifth adder 22 for calculating a target current <j(t)> by adding the correction amount <$j_h(t)$> to the first target current <$j_1(t)$> as an output signal from the inverse dq transformer 27 and supplying it to the first adder 20. The power conversion device has the first adder 20, for performing subtraction between the output current <$i_p(t)$> detected by the first current detection means 19 and the target currents <j(t)> and supplying an error <Δ(t)> therebetween to the converter control means 17, outside the target current generation means 110.

The first current detection means 19 have to detect at least two of the output currents $i_p(t)$ flowing through the three phases, the second current detection means 7 have to detect at least two of the load currents $i_s(t)$ flowing through the three phases, and the voltage detection means 18 have to detect at least two of the output terminal voltages (line voltages) v(t) applied across the lines. The second current detection means 7, the filter current command $i_{CF}$, and the deviation compensation command D(t) may be omitted. The filter circuit 5, which has been described as having a circuit of three capacitors $C_F$ connected in a delta configuration and resistances $R_F$ interposed between the three terminals of the delta configuration and the three lines a, b and c, may be composed of a circuit of three capacitors $C_F$ connected in a star configuration and resistances $R_F$ interposed between the three terminals of the star configuration and the three lines a, b and c. In this example or in this embodiment, the resistances $R_F$ may be omitted from the filter circuit 5. The positions of the first dq transformer 24 and a low-pass filter 25 may be exchanged. The positions of the fifth adder 22 and the inverse dq transformer 27 may be exchanged, and a signal indicating the output terminal voltage <v(t)> detected by the voltage detection means 18 may be supplied to the DC component suppression means 8 after passing through the first dq transformer 24 so that a target current <$j_{dq1}(t)$> can be subjected to inverse dq transformation after being corrected in the dq space and inputted into the first adder 20 as a target value <j(t)>. Also, αβ transformation may be used instead of dq transformation, and coordinate transformation may not be performed.

As the process for obtaining a target current, the process flow shown in FIG. 2A and FIG. 2B can be used.

To calculate a correction amount <$j_h(t)$> for the target current, DC components $V_{abD}$, $V_{cbD}$ and $V_{caD}$ are obtained from the integrals of line voltages (filter voltages) $v_{ab}(t)$ and $v_{cb}(t)$, and correction amounts $j_{ah}(t)$, $j_{bh}(t)$ and $j_{ch}(t)$ are calculated using the integrals. Equations (9a) to (9c) are the correction amounts $j_{ah}(t)$, $j_{bh}(t)$ and $j_{ch}(t)$ subjected to Laplace transform and represented using the Laplace operator s.

$$j_{ah}(s) = -(2/3) \cdot (v_{ab}(s)/(L_F \cdot s)) + (1/3) \cdot (v_{cb}(s)/(L_F \cdot s)) \quad (9a)$$

$$j_{bh}(s) = (1/3) \cdot (v_{ab}(s)/(L_F \cdot s)) + (1/3) \cdot (v_{cb}(s)/(L_F \cdot s)) \quad (9b)$$

$$j_{ch}(s) = (1/3) \cdot (v_{ab}(s)/(L_F \cdot s)) - (2/3) \cdot (v_{cb}(s)/(L_F \cdot s)) \quad (9c)$$

Figure 4:
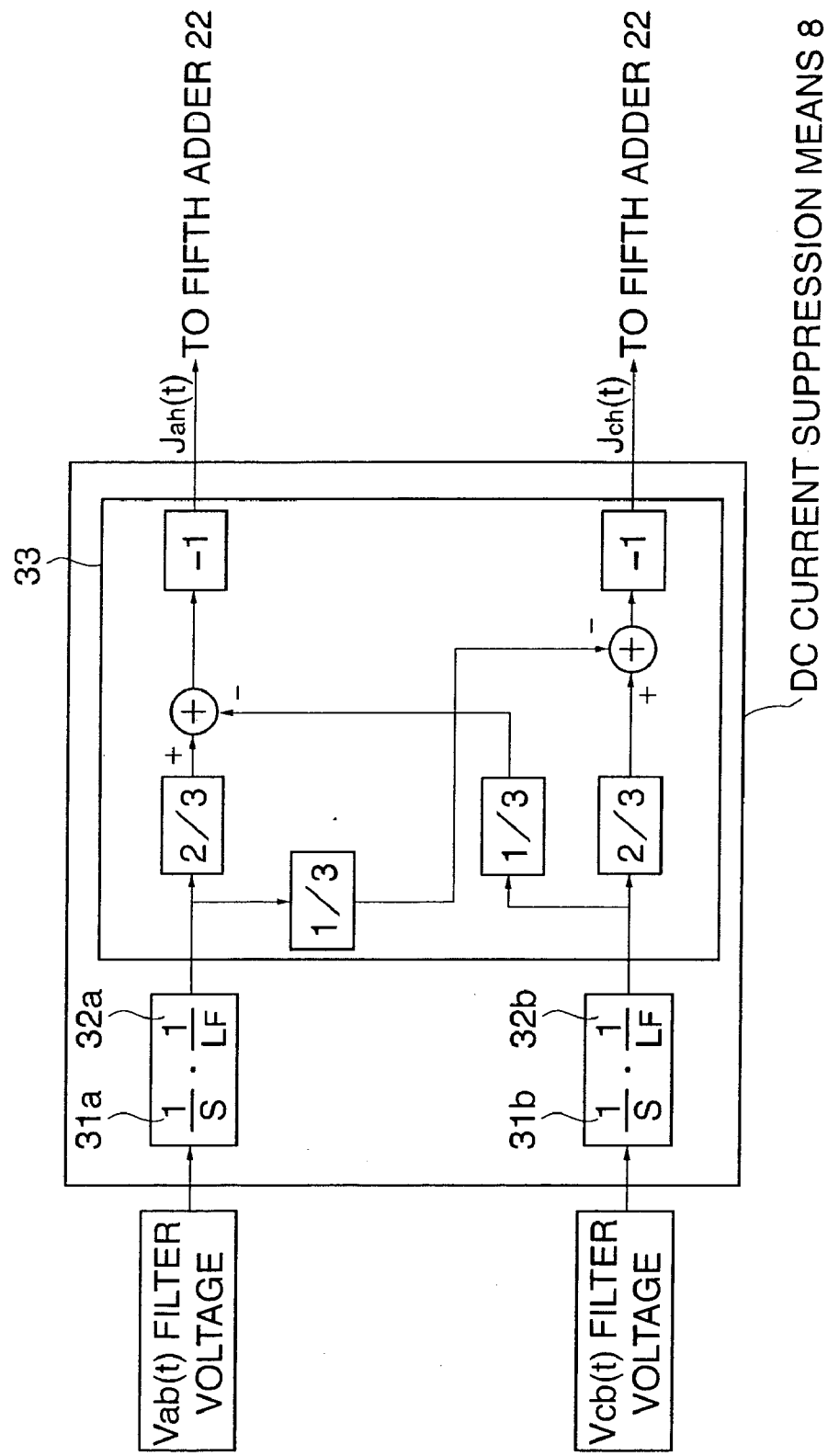
FIG. 4 shows an example of the process in the DC component suppression means of the second embodiment.

FIG. 4 shows an example of the process in the DC component suppression means 8 of the second embodiment. Correction amounts $j_{ah}(t)$ and $j_{ch}(t)$ are obtained from line voltages $v_{ab}(t)$ and $v_{cb}(t)$, and the flow is formed according to Equations (9a) and (9c). The DC component suppression means 8 has integration means 31a and 31b, multiplication means 32a and 32b, and a correction amount calculation means 33. The DC component suppression means 8 has two integration means and two multiplication means. The integration means 31a and 31b obtain integrals of two output terminal voltages (line voltages or filter voltages) $v_{ab}(t)$ and $v_{cb}(t)$, respectively, detected by the voltage detection means 18, and the multiplication means 32a and 32b multiply the two integrals, respectively, by a gain ($1/L_F$). The correction amount calculation means 33 divides the multiplication products into one third and two thirds, and performs addition or subtraction of the divided multiplication products (more specifically, performs the calculations of Equations (9a) and (9c)) to obtain correction amounts $j_{ah}(t)$ and $j_{ch}(t)$. Then, the correction amount calculation means 33 invert the signs of the correction amounts $j_{ah}(t)$ and $j_{ch}(t)$ and inputs the results into the fifth adder 22 shown in FIG. 3. The correction amount $j_{bh}(t)$ can be obtained from $j_{ah}(t)$ and $j_{ch}(t)$ by Equation (9b).

Figure 5:
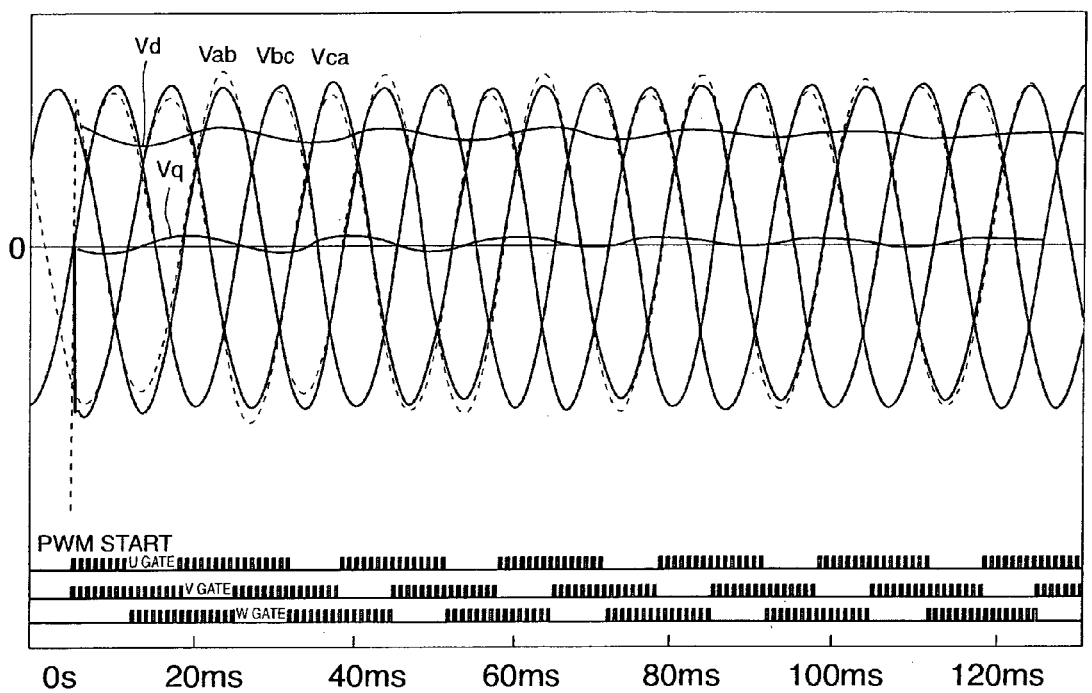
FIG. 5 shows the result of an experiment in which DC components were added to target currents in the second embodiment.
Figure 24:
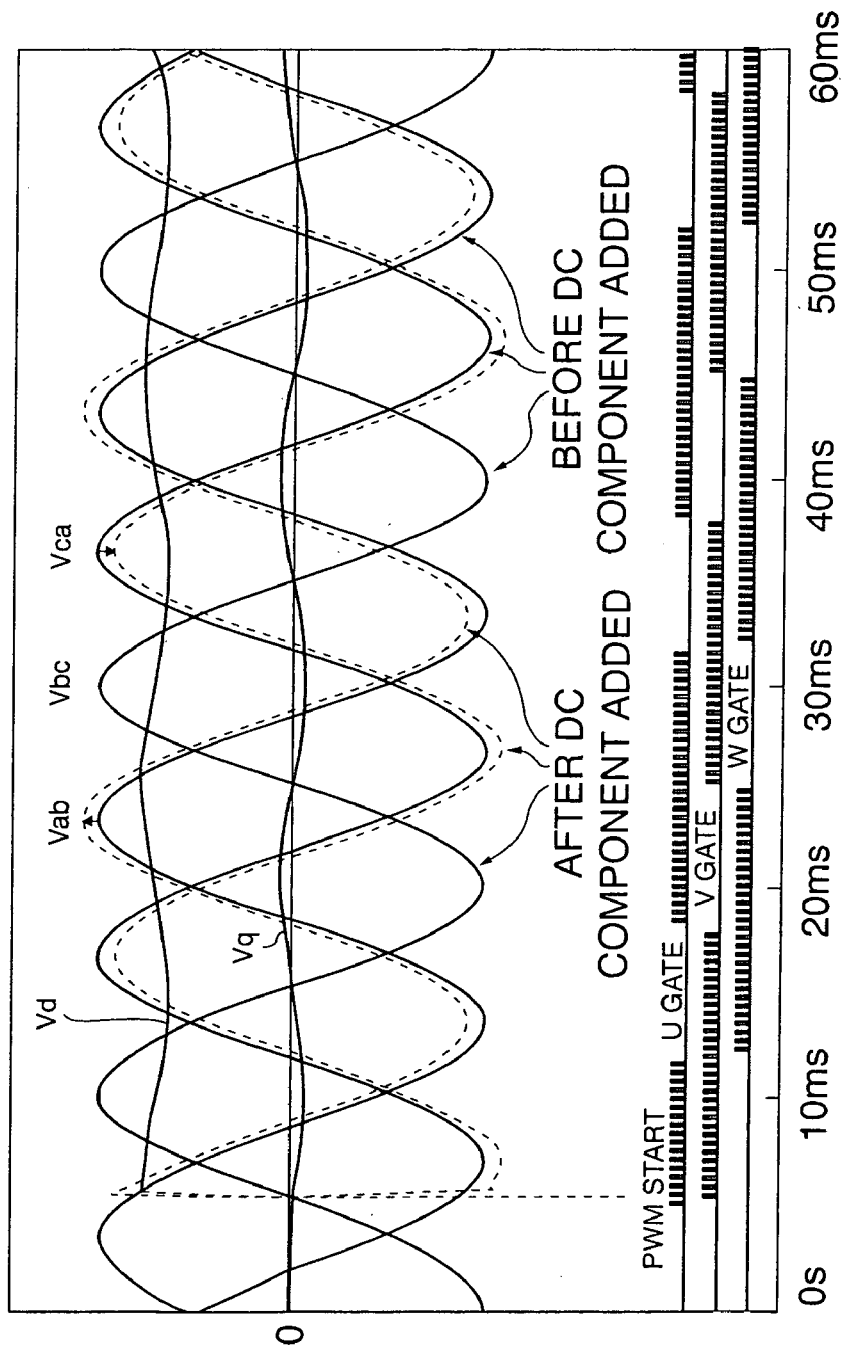
FIG. 24 shows the result of an experiment in which DC components were added to target currents in a three-phase power conversion device without means for DC component suppression.
Figure 25:
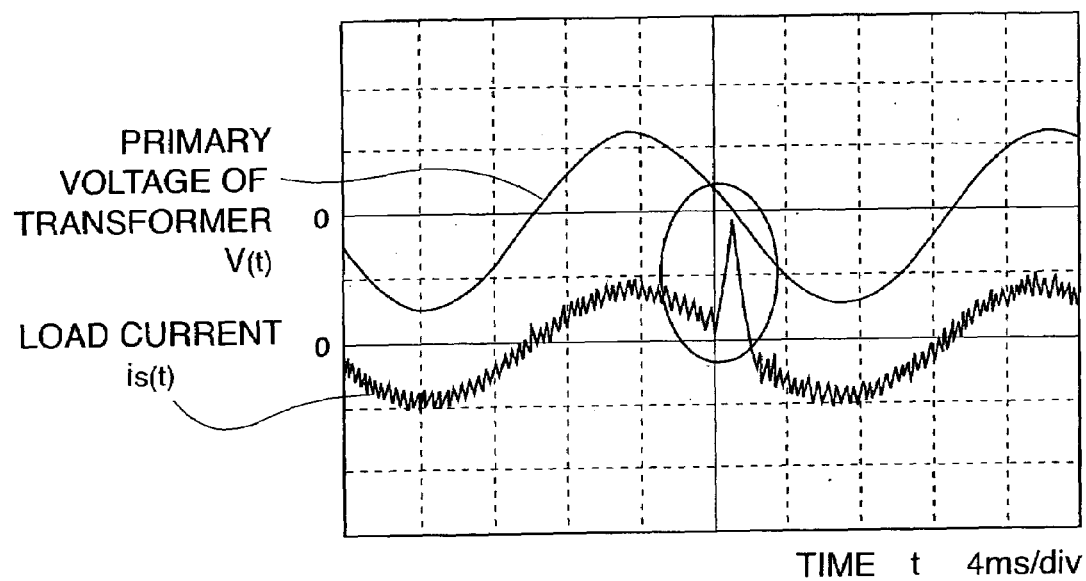
FIG. 25 shows an example of the waveform on the primary side of a transformer when a resistance load is connected as a load via the transformer to the single-phase power conversion device without measures for DC component suppression and the single-phase power conversion device is operated.

The correction amounts $j_{ah}(t)$, $j_{bh}(t)$ and $j_{ch}(t)$ obtained in the DC component suppression means 8 are added to the first target currents $j_{a1}(t)$, $j_{b1}(t)$ and $j_{c1}(t)$, respectively, to obtain target currents $j_a(t)$, $j_b(t)$ and $j_c(t)$ in the fifth adder 22. Further, the first adder 20 calculates errors $\Delta_a(t)$, $\Delta_b(t)$ and $\Delta_c(t)$ between the target currents $j_a(t)$, $j_b(t)$ and $j_c(t)$ and output currents $i_{pa}(t)$, $i_{pb}(t)$ and $i_{pc}(t)$, respectively, detected by the first current detection means 19, and inputs them into the PWM control means 17, which in turn controls the semiconductor switch elements of the converter 2 based on the errors $\Delta_a(t)$, $\Delta_b(t)$ and $\Delta_c(t)$ FIG. 5 shows the result of an experiment in which. DC components ($I_{aD}$=1A, $I_{bD}$=−2A and $I_{cD}$=1A) were intentionally added to target currents $j_a(t)$, $j_b(t)$ and $j_c(t)$, respectively, with the three-phase power conversion device of the second embodiment shown in FIG. 3. Pulse signals (on-off signals) supplied to the gates of the semiconductor switch elements of the converter 2 are shown in the lower section, and the line voltages $v_{ab}(t)$, $v_{bc}(t)$ and $v_{ca}(t)$ and DC components (d-axis component $V_d$ and q-axis component $V_q$) obtained by dq transformation of the line voltages are shown in the upper section. The horizontal axis represents time. The load conditions are the same as those in the experiment shown in FIG. 24. The DC components were added at the moment indicated by a dotted line perpendicular to the horizontal axis in FIG. 5 (at about 5 ms). The waveforms before the DC components were added are shown by solid lines, and the waveforms after the DC components were added are shown by dotted lines. Although 50 Hz components were generated in the DC components ($V_d$ and $V_q$), their amplitudes gradually decreased approximately within 120 ms, and the DC components in the line voltages $v_{ab}(t)$, $v_{bc}(t)$ and $v_{ca}(t)$ (the differences between the solid line curves and the dotted line curves, that is, the biased amounts) gradually converged to 0. In this experiment, the DC components in the line voltages across the lines a and b and lines b and c were 5.278 V and −5.347 V, respectively, immediately after the DC components were added. However, the DC components in the line voltages across the lines a and b and lines b and c were 1.3 mV and 26.3 mV, respectively, as measured in a steady state after a few seconds. Among the measurement results, the value 26.3 mV across the lines b and c, for example, is 0.005% with respect to a rated line voltage of 200 V and can be regarded as within the margin of error. That is, a DC component suppression effect is sufficiently achieved.

Figure 6A:
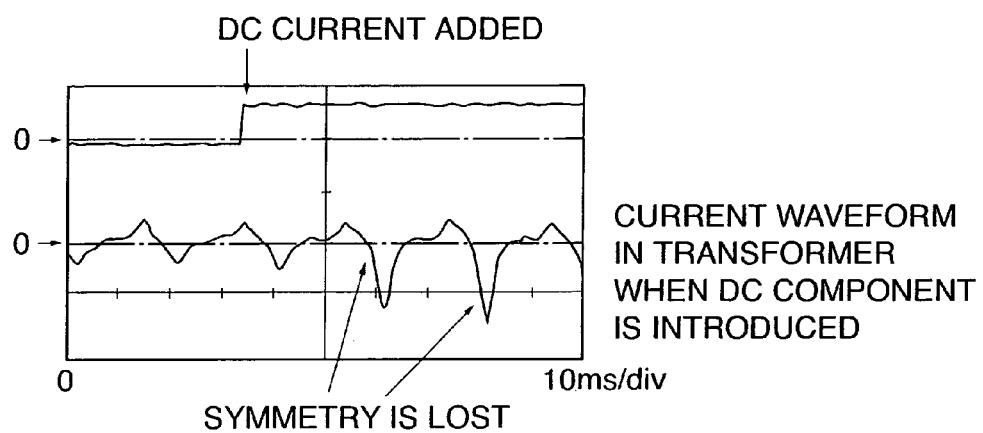
FIG. 6A shows an example of the result of an experiment about transient response in the second embodiment (immediately after a DC current was added).
Figure 6B:
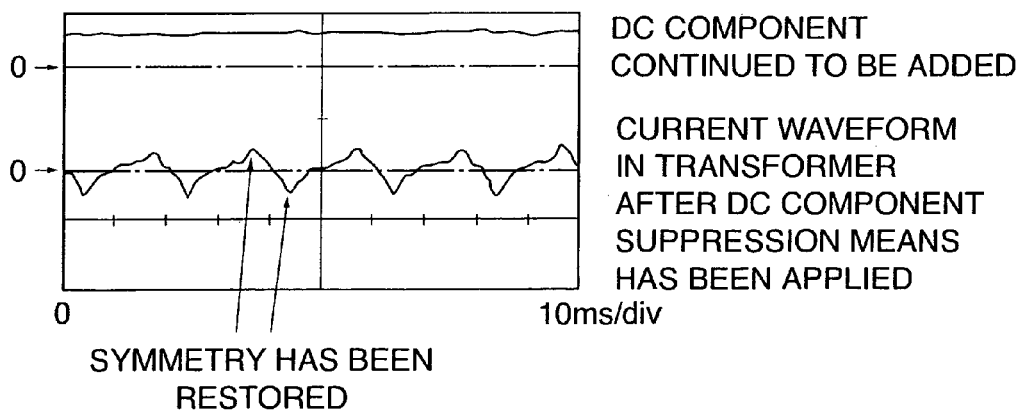
FIG. 6B shows an example of the result of an experiment about transient response in the second embodiment (a few seconds after a DC current was added).

FIGS. 6A and 6B show the result of an experiment to see the transient response of the current flowing through the transformers in which the transformers were connected as the load 4a and a DC component was intentionally added to the target currents $j_a(t)$, $j_b(t)$ and $j_c(t)$ and the circuit shown in FIG. 3 was steadily operating. As the transformers, three single-phase transformers were used. FIG. 6A shows the waveform of the current flowing to the single-phase transformers immediately after the DC current was added (when biased magnetization was generated) and FIG. 6B shows the wave form of the current flowing to the single-phase transformers a few seconds after the DC current was added (when biased magnetization was suppressed). The horizontal axis represents time (10 ms/div). It can be seen from FIG. 6A that immediately after the DC current was added (when the triggering signal shown in the upper section of FIG. 6A was changed from L level (0 V) to H level), the peak values of the current to the single-phase transformers were increased excessively and the positive-negative symmetry of the current waveform was lost because of biased magnetization of the single-phase transformers. However, as shown in FIG. 6B, even when the DC component was continued to be added (when the triggering signal shown in the upper section of FIG. 6(b) was kept at H level), the current to the single-phase transformers returned to the same normal value as before the biased magnetization and the symmetry of the current waveform was restored, which indicates that the DC component was suppressed, a few seconds after the start of addition of the DC current (after the triggering signal was changed).

Third Embodiment

Figure 7:
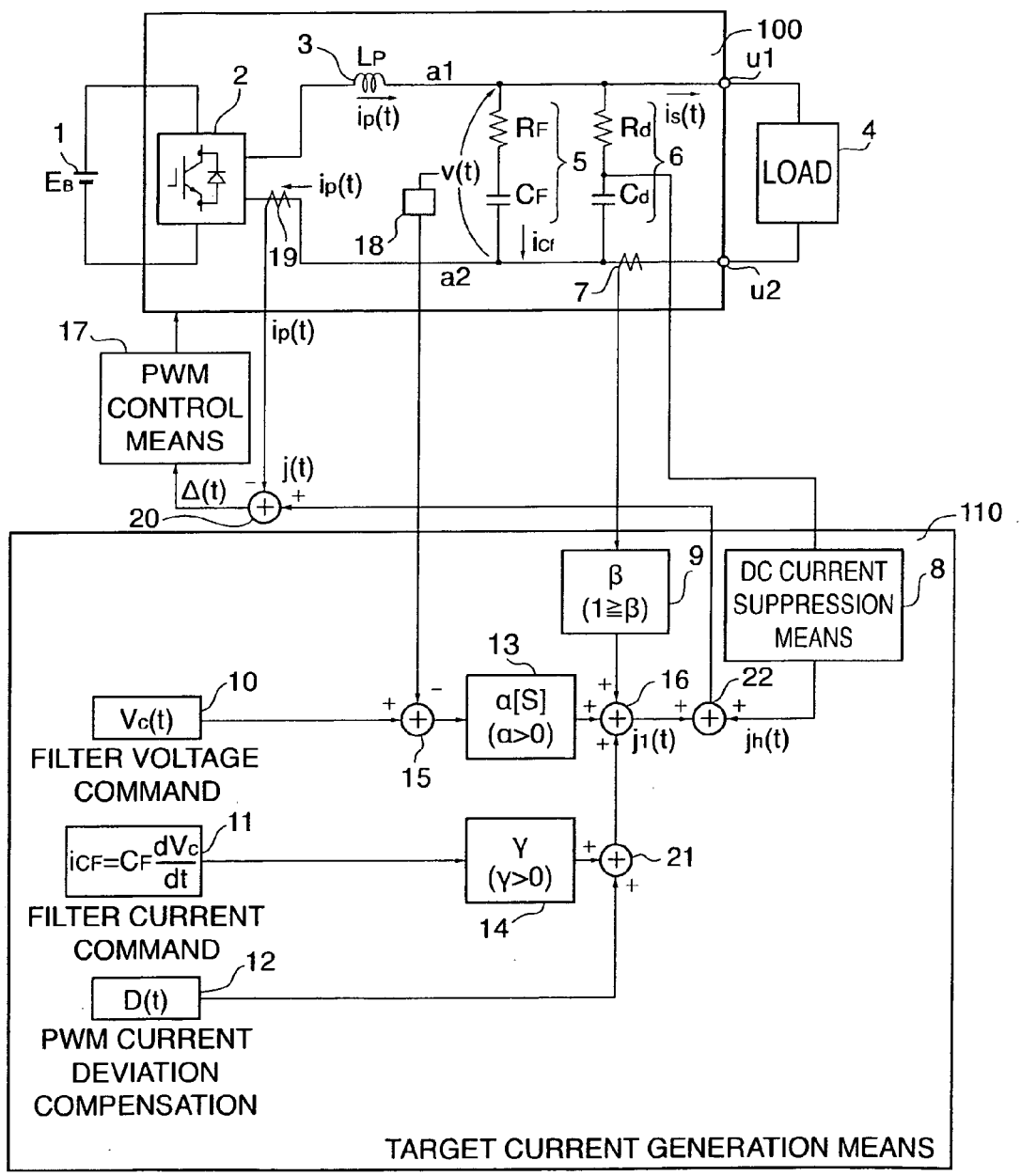
FIG. 7 shows an example of the circuit configuration of a single-phase power conversion device according to a third embodiment.

FIG. 7 shows an example of the circuit configuration of a single-phase power conversion device according to a third embodiment. Those parts having the same functions as those in FIG. 1 are designated in FIG. 7 by the same reference numerals and their description is omitted. The differences from the embodiment shown in FIG. 1 are mainly described. The differences are that a DC voltage detection means 6 is interposed between the filter circuit 5 and the second current detection means 7 and a DC component $V_D$ in the output terminal voltage v(t) is detected by the DC voltage detection means 6, and that the DC component suppression means 8 receives the DC component $V_D$ in the output terminal voltage v(t) detected by the DC voltage detection means 6 instead of a filter voltage detected by the filter circuit 5 and calculates a correction amount $j_h(t)$ for the target current. The DC voltage detection means 6, which is interposed between the filter circuit 5 and the second current detection means 7, has a resistance $R_d$ and a capacitor $C_d$ connected in series between the lines a1 and a2 and detects a DC component $V_D$ across the lines a1 and a2 at the midpoint between the resistance $R_d$ and the capacitor $C_d$. Since the DC component is also included in the output terminal voltage v(t), the DC voltage detection means 6 functions as a voltage detection means 18 in this embodiment. The process in the target current generation means 110 is the same as that in the first embodiment except for the process in the DC component suppression means 8. The DC voltage detection means 6 may be located between the inductor 3 and the filter circuit 5, or between the current detection means 7 and the output terminals u1 and u2.

In the power conversion device according to this embodiment, the voltage detection means has a DC voltage detection means 6 composed of a circuit of a capacitor $C_d$ and a resistance $R_d$ connected in series between the output terminals u1 and u2 for detecting a DC voltage component $V_D$ applied across the output terminals u1 and u2, and the target current generation means 110 has a DC component suppression means 8 for suppressing a DC component in the single-phase AC power by correcting the target current j(t) based on the DC voltage component $V_D$. Designated as 18 in FIG. 7 functions as a means for detecting a filter voltage v(t).

In this configuration, there can be provided a quick-response, high-accuracy and small-size power conversion device which can suppress the DC component in the AC power to be outputted therefrom without using a large part such as a reactor.

It can be understood that since the relation expressed by Equation (6) holds between the DC component $V_D$ in the output terminal voltage v(t) and the DC component $I_D$ generated in the target current j(t), the DC component can be suppressed by providing a correction amount $j_h(t)$ to the target current j(t) as feedback according to the relation $I_D = V_D \cdot \alpha$. As the correction amount $j_h(t)$, a fixed value with a polarity opposite that of the DC component $I_D$ may be used or a value calculated with Equation (6) may be used.

Figure 8:
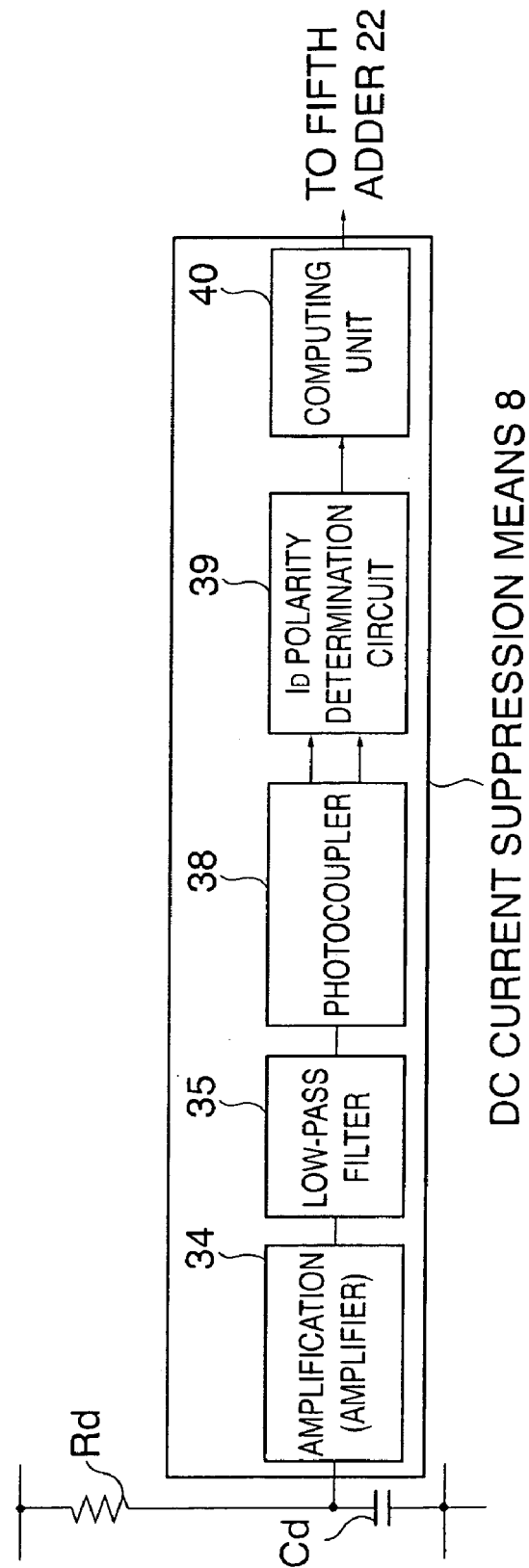
FIG. 8 shows an example of the process in the DC component suppression means of the third embodiment.

FIG. 8 shows an example of the process in the DC component suppression means 8 of the third embodiment. The DC component suppression means 8 of an analog circuit obtains a DC component $I_D$. The DC component suppression means 8 has an amplifier 34 as an amplification means for amplifying the DC component $V_D$ detected by the DC voltage detection means 6, and an $I_D$ polarity determination circuit 39. In this embodiment, the DC component $V_D$ is inputted into the amplifier 34 and amplified therein. The minute DC component $V_D$ detected is amplified in the amplifier 34, passed through a low-pass filter 35 to remove a high-frequency component therefrom, and inputted into a photocoupler 38. The $I_D$ polarity determination circuit 39 is activated by an output signal from the photocoupler 38 insulated from the input section and determines the polarity of the DC component $I_D$ in the load current. In the case of a single-phase power conversion device, when the voltage of the capacitor $C_d$ is positively biased, the DC component $I_D$ is also positively biased, and when the voltage of the capacitor $C_d$ is negatively biased, the DC component $I_D$ is also negatively biased. A correction amount $j_h(t)$ is set in advance in a computing unit 40. When the polarity of the DC component $I_D$ in the load current is positive, the computing unit 40 outputs the correction amount with a negative sign, and when the polarity of the DC component $I_D$ is negative, the computing unit 40 outputs the correction amount with a positive sign. The correction amount $j_h(t)$ is inputted into the fifth adder 22. The low-pass filter 35 may be omitted. In this embodiment, there can be provided a quick-response, high-accuracy and small-size power conversion device in which the DC component in the AC power to be outputted therefrom can be suppressed by a simple circuit configuration using an analog circuit without using a large part such as a reactor.

Fourth Embodiment

Figure 9:
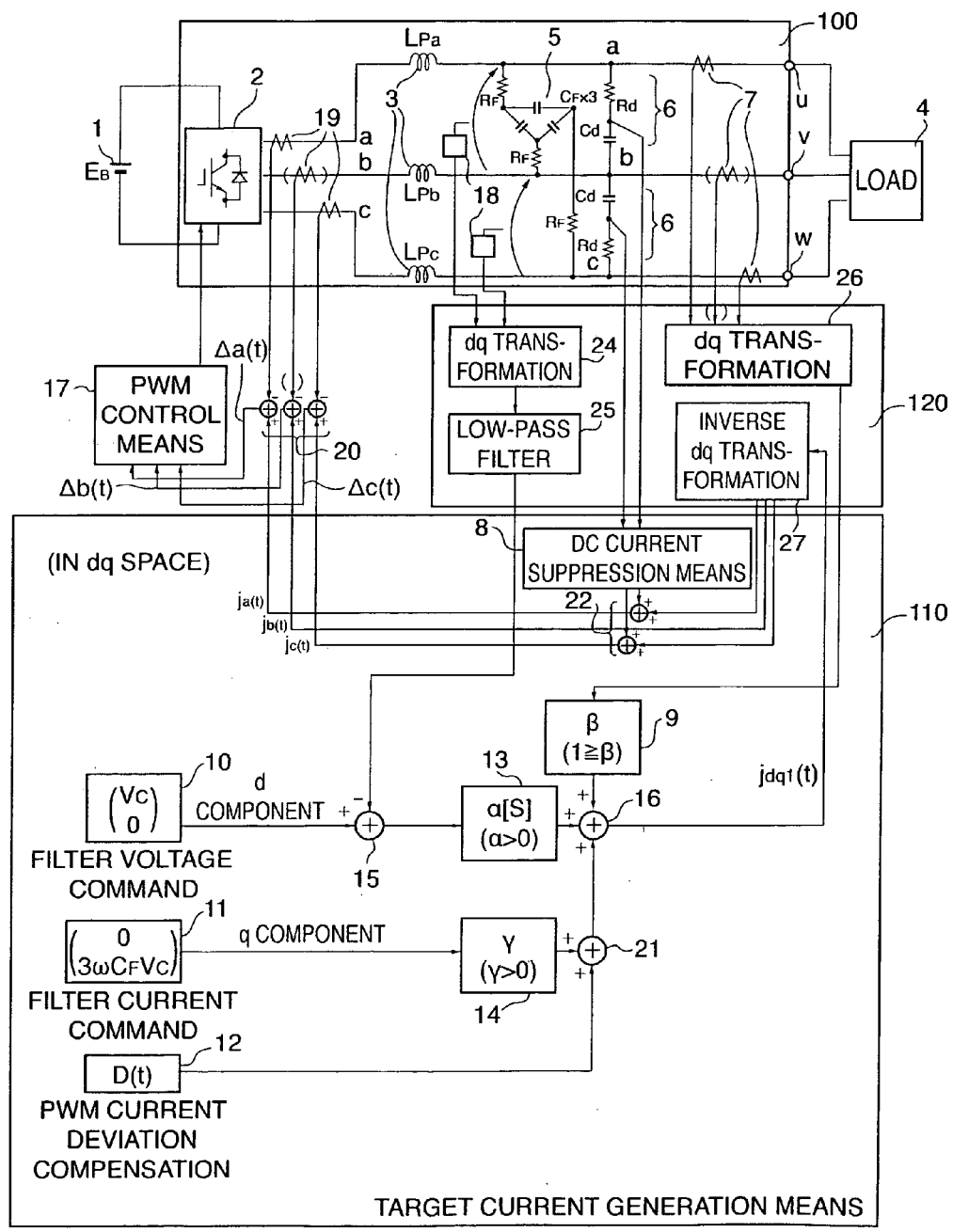
FIG. 9 shows an example of the circuit configuration of a three-phase power conversion device according to a fourth embodiment.

FIG. 9 shows an example of the circuit configuration of a three-phase power conversion device according to a fourth embodiment of the present invention. Those parts having the same functions as those in FIG. 3 are designated in FIG. 9 by the same reference numerals and their description is omitted. The differences from the embodiment shown in FIG. 3 are mainly described. The differences are that DC voltage detection means 6 are interposed between the filter circuit 5 and the second current detection means 7 and DC components $V_{abD}$ and $V_{cbD}$ in the output terminal voltage v(t) (more specifically, DC components in two of three line voltages) are detected by the DC voltage detection means 6, and that the DC component suppression means 8 receives the DC components $V_{abD}$ and $V_{cbD}$ in the output terminal voltage <v(t)> detected by the DC voltage detection means 6 instead of the filter voltage detected by the filter circuit 5 and calculates a correction amount $<j_h(t)>$ for the target current. The DC voltage detection means 6 interposed between the filter circuit 5 and the second current detection means 7 are two sets of a resistance $R_d$ and a capacitor $C_d$ in series provided between the lines a and b and between the lines c and b and detect DC components $V_{abD}$ and $V_{cbD}$ across the lines a and b and between the lines c and b, respectively, at the midpoints between the resistances $R_d$ and the capacitors $C_d$. In this embodiment, the DC current detection means 6 functions as a voltage detection means. The brackets ( ) in FIG. 9 means that the parts in the brackets can be omitted. The DC current detection means 6 may be located between the inductors 3 and the filter circuit 5, or between the current detection means 7 and the output terminals u, v and w.

In the power conversion device according to this embodiment, a voltage detection means has DC voltage detection means 6 composed of circuits of a capacitor $C_d$ and a resistance $R_d$ connected in series between the output terminals u, v and w for detecting DC voltage components $<V_D>(V_{abD}, V_{cbD})$ across the output terminals u v and w, and the target current generation means 110 has a DC component suppression means 8 for suppressing a DC component in the three-phase AC power by correcting a target current $<j(t)>(j_a(t), j_b(t), j_c(t))$ based on the DC voltage components $<V_D>(V_{abD}, V_{cbD})$. Designated as 18 in FIG. 9 function as means for detecting a filter voltage <v(t)>. Three DC current detection means 6 or three voltage detection means 18 may be provided.

In this configuration, there can be provided a quick-response, high-accuracy and small-size three-phase power conversion device which can suppress the DC component in the AC power to be outputted therefrom without using a large part such as a reactor.

The process in the target current generation means 110 is the same as that in the second embodiment except for the process in the DC component suppression means 8.

Equations (11a) and (11b) are derived from Equations (7a) to (7c) and Equation (10) below.

$$I_{aD}+I_{bD}+I_{cD}=0 \quad (10)$$

$$I_{aD}=\alpha/3 \cdot (2V_{abD}+V_{cbD}) \quad (11a)$$

$$I_{cD}=-\alpha/3 \cdot (V_{abD}+2V_{cbD}) \quad (11b)$$

It can be understood from above that when the calculation results of $(2V_{abD}+V_{cbD})$ and $(V_{abD}+2V_{cbD})$ are obtained, the DC components $I_{aD}$, $I_{bD}$, and $I_{cD}$ in the load currents flowing through the lines a, b and c, respectively, can be obtained, and that the DC component can be suppressed by providing the DC components $I_{aD}$, $I_{bD}$, and $I_{cD}$ to the target current <j(t)> as feedback.

Figure 10:
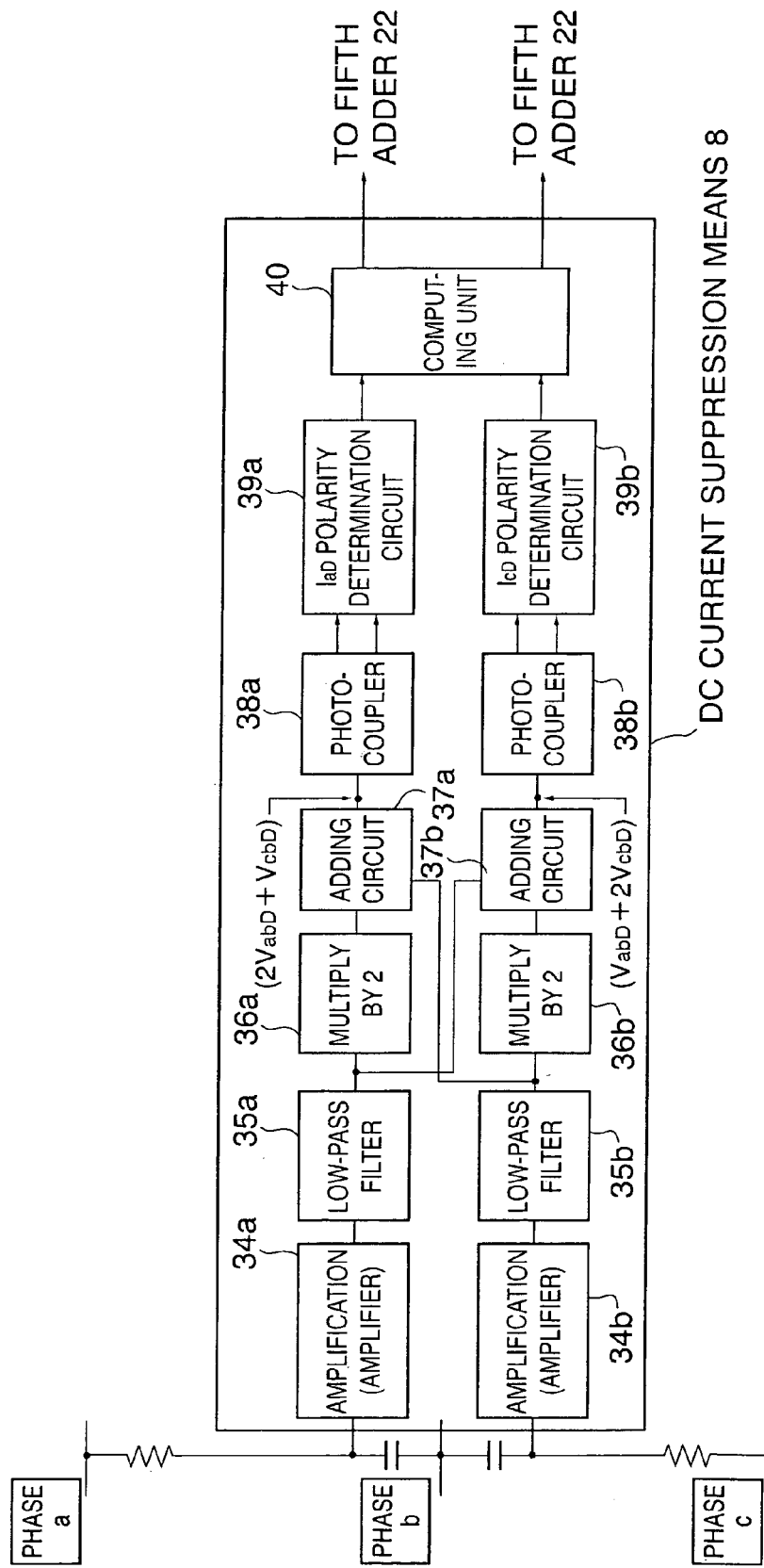
FIG. 10 shows an example of the process in the DC component suppression means of the fourth embodiment.

FIG. 10 shows an example of the process in the DC component suppression means 8 of the fourth embodiment. This is the flowchart when the DC component suppression means 8 is composed of an analog circuit and obtains the DC components $I_{aD}$ and $I_{cD}$ in the load currents $i_s(t)$ according to Equations (11a) and (11b). The DC component suppression means 8 has amplifiers 34a and 34b as amplification means for amplifying the two DC components $V_{abD}$ and $V_{cbD}$, respectively, detected by the DC voltage detection means 6, an adding circuit 37a as a first addition means, an adding circuit 37b as a second addition means, an $I_{aD}$ polarity determination circuit 39a as a first determination means, and an $I_{cD}$ polarity determination circuit 39b as a second determination means.

In this embodiment, the first DC component $V_{abD}$ and the second DC component $V_{cbD}$ are inputted into the amplifiers 34a and 34b, respectively, and amplified therein. The minute DC component $V_{abD}$ detected across the lines a and b is amplified in the amplifier 34a, passed through a low-pass filter 35a to remove a high-frequency component therefrom, and doubled in a doubler 36a to obtain $2V_{abD}$. The DC component $V_{cbD}$ detected across the lines c and b, amplified in the amplifier 34b, and passed through a low-pass filter 35b to remove a high-frequency component therefrom is added to $2V_{abD}$ in the adding circuit 37a to obtain the result of calculation $(2V_{abD}+V_{cbD})$. The calculation result is inputted into a photocoupler 38a, and the $I_{aD}$ polarity determination circuit 39a is activated by an output signal from the photocoupler 38a insulated from the input section to determine the polarity of the DC component $I_{aD}$ in the load current. A correction amount $j_h(t)$ is set in advance in a computing unit 40. When the polarity of the DC component $I_{aD}$ in the load current is positive, the computing unit 40 outputs the correction amount with a negative sign and inputs it into the fifth adder 22, and when the polarity of $I_{aD}$ is negative, the computing unit 40 outputs the correction amount with a positive sign and inputs it into the fifth adder 22. On the other hand, the DC component $V_{abD}$ detected across the lines a and b, amplified in the amplifier 34a and passed through the low-pass filter 35a and $2V_{cbD}$ obtained by doubling the DC component $V_{cdD}$ detected across the lines c and b, amplified in the amplifier 34b and passed through the low-pass filter 35b in a doubler 36b are added in the adding circuit 37b to obtain the result of calculation $(V_{abD}+2V_{cbD})$. The calculation result is inputted into a photocoupler 38b, and the polarity of the DC component $I_{cD}$ in the load current is determined by the $I_{cD}$ polarity determination circuit 39b. Then, the computing unit 40 inputs a correction amount with a positive or negative sign into the fifth adder 22.

In the power conversion device according to this embodiment, the DC component suppression means 8 has amplifiers 34a and 34b as means for amplifying DC components $V_{abD}$ and $V_{cbD}$, respectively, detected by the DC voltage detection means 6, a first addition means 37a for adding a double of the first DC component $V_{abD}$ and the second DC component $V_{cbD}$, a second addition means 37b for adding the first DC component $V_{abD}$ and a double of the second DC component $V_{cbD}$, a first determination means 39a for determining the polarity of the voltage value obtained in the first addition means 37a and outputting the voltage value with a sign based on the determination result, and a second determination means 39b for determining the polarity of the voltage value obtained in the second addition means 37b and outputting the voltage value with a sign based on the determination result.

Also in this embodiment, the DC components can be suppressed with a simple circuit configuration using an analogue circuit by detecting DC components in the output terminal voltage and correcting the target current as in the case with the third embodiment.

Fifth Embodiment

Figure 11:
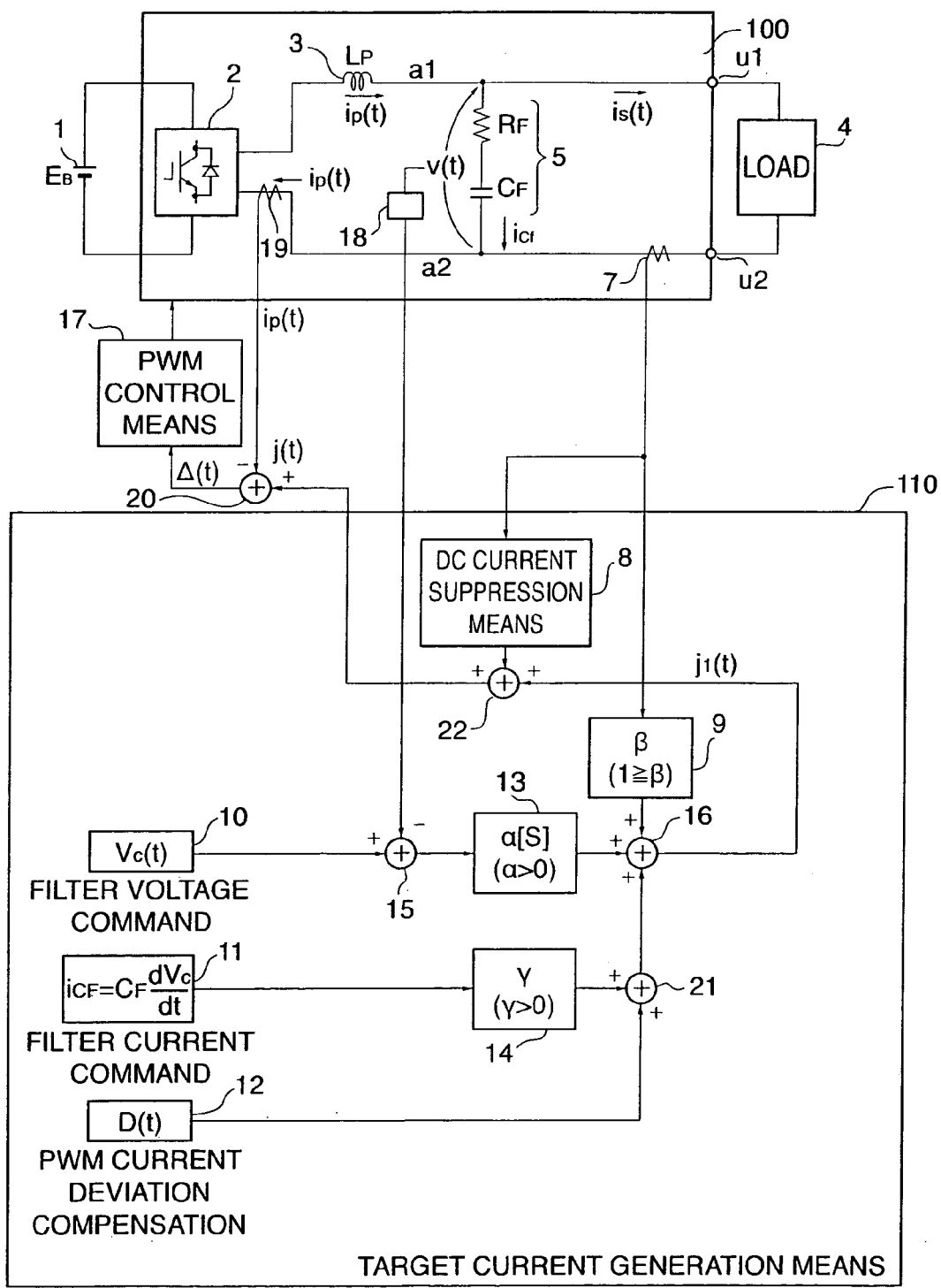
FIG. 11 shows an example of the circuit configuration of a single-phase power conversion device according to a fifth embodiment.

FIG. 11 shows an example of the circuit configuration of a single-phase power conversion device according to a fifth embodiment of the present invention. Those parts having the same functions as those in FIG. 21 are designated in FIG. 11 by the same reference numerals, and the differences are mainly described. The differences from the device shown in FIG. 21 are that the output from the fourth adder 16 is changed from "target current" to "first target current $j_f(t)$" and that a DC component suppression means 8 for receiving a load current $i_s(t)$ as a detection signal from the second current detection means 7 and calculating a correction amount $j_h(t)$ for a target current $j(t)$ based on the asymmetry of the load current $i_s(t)$, and a fifth adder 22 for adding the correction amount $j_h(t)$ to the first target current $j_f(t)$ and outputting the target current $j(t)$ to a first adder 20 are added in the target current generation means 110. The correction is carried out to suppress a DC component $I_D$ in the AC power (that is, the DC component in the load current or output current).

That is, the power conversion device according to this embodiment is a single-phase power conversion device which produces single-phase AC power from a DC power source 1 and supplies the power to a load 4 connected to output terminals u1 and u2 thereof, and has a converter 2 for converting the DC power from the DC power source 1 to single-phase AC power, an inductor 3 connected to the AC side of the converter 2, a first current detection means 19 for detecting an output current $i_p(t)$ flowing through the inductor 3, a second current detection means 7 for detecting a load current $i_s(t)$ being supplied to the load 4, a target current generation means 110 for generating a target current $j(t)$ as a target value for the output current $i_p(t)$, and a converter control means 17 for pulse width modulation control of the converter 2 based on an error $\Delta(t)$ between the output current $i_p(t)$ and the target current $j(t)$. The target current generation means 110 has a DC component suppression means 8 for suppressing the DC component in the single-phase AC power by correcting the target current $j(t)$ based on the asymmetry of the load current $i_s(t)$ detected by the second current detection means 7.

In this configuration, there can be provided a quick-response, high-accuracy and small-size power conversion device which can suppress the DC component in the AC power to be outputted therefrom without using a large part such as a reactor.

Figure 12A:
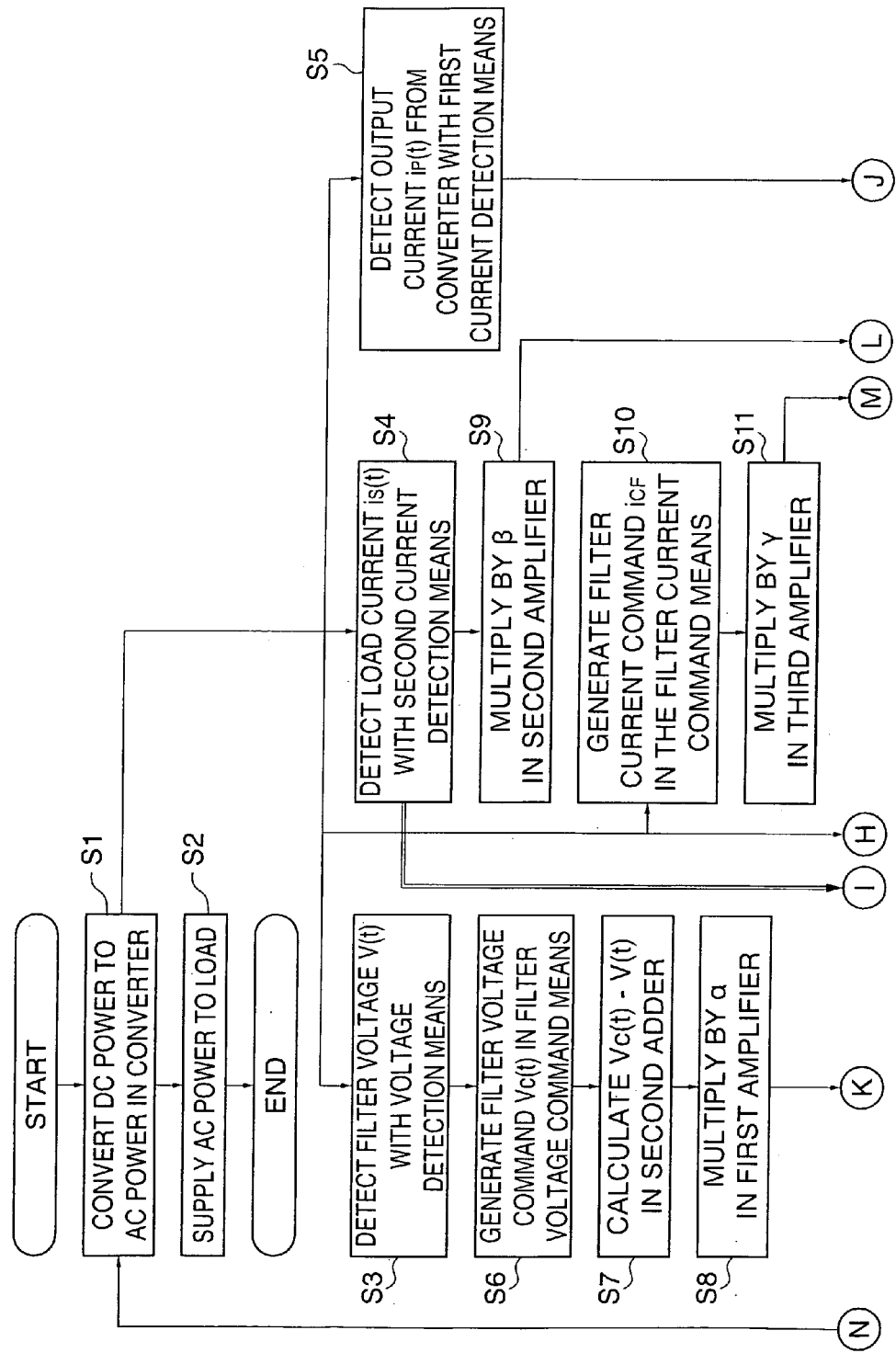
FIG. 12A shows an example of a process flow of the DC component suppression method in the power conversion device according to the fifth embodiment.
Figure 12B:
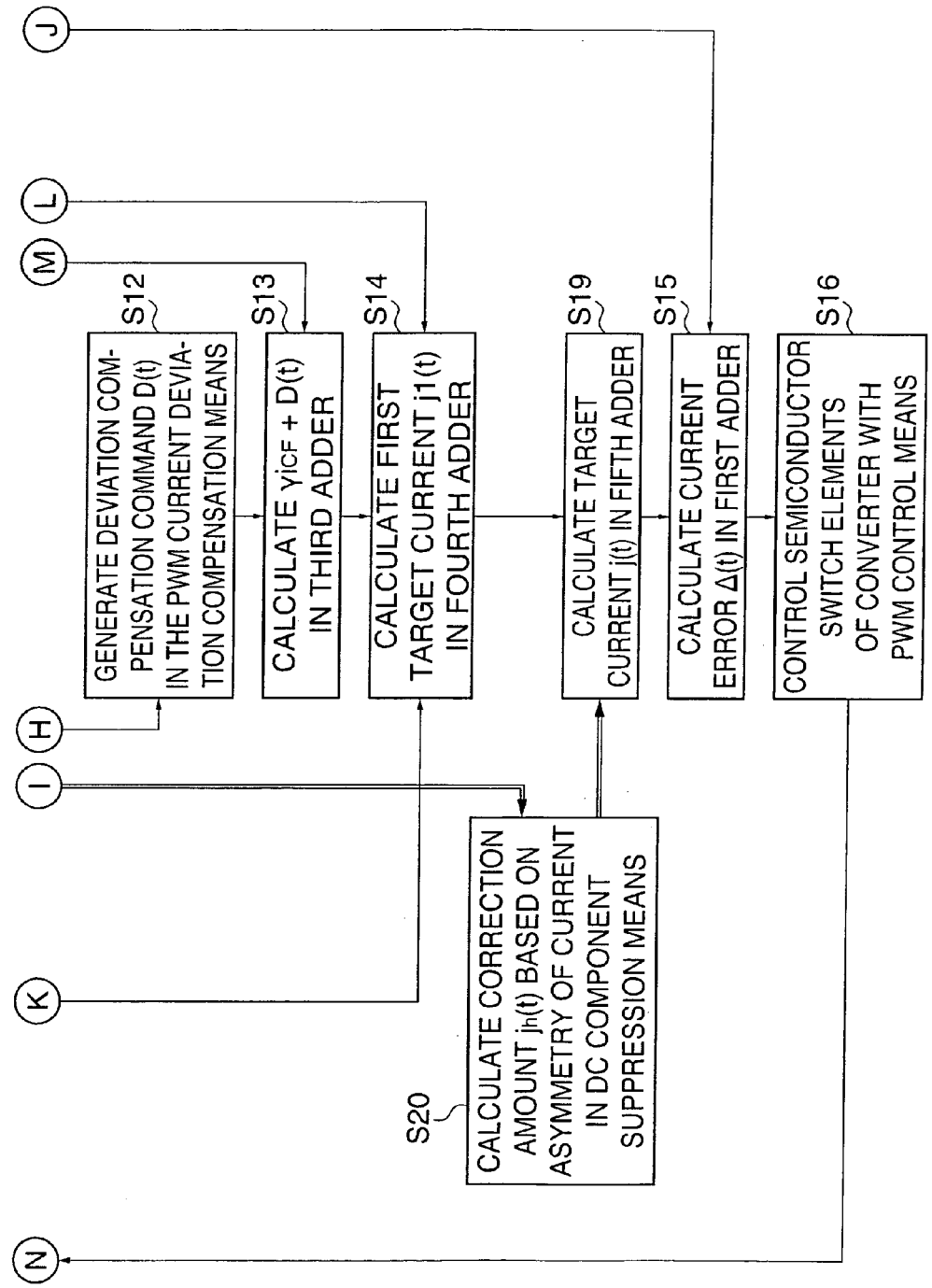
FIG. 12B shows an example of a process flow of the DC component suppression method in the power conversion device according to the fifth embodiment.

FIG. 12A and FIG. 12B show an example of a process flow of the DC component suppression method in the power conversion device according to this embodiment. Here, the steps added to the flowchart shown in FIG. 22A and FIG. 22B are described, and redundant explanation is omitted. The added flows are shown in double lines in the drawing. In order to suppress the DC component $I_D$ in the AC power, a correction amount $j_h(t)$ is calculated in the DC component suppression means 8 based on the asymmetry of the load current $i_s(t)$ detected by the second current detection means (step S20) and provided to the target current as feedback. The correction amount $j_h(t)$ is added to the first target current $j_f(t)$ in the fifth adder 22 to obtain a target current $j(t)$ (step S19). The step of generating the target current $j(t)$ in FIG. 22A and FIG. 22B (step S14') is changed to a step of generating the first target current $j_f(t)$ (step S14) in FIG. 12A and FIG. 12B.

That is, the DC component suppression method in a power conversion device according to this embodiment is a DC component suppression method in a power conversion device which converts DC power to supply AC power and includes a conversion step of converting DC power to AC power in a converter 2 (step S1), a power supply step of supplying the AC power to a load 4 (step S2), a load current detection step of detecting a load current $i_s(t)$ flowing to a load 4 with a second current detection means 7 (step S4), an output current detection step of detecting an output current $i_p(t)$ flowing from the converter 2 to an inductor 3 on a line a1 (or a2) (step S5), a target current generation step of generating a target current $j(t)$ as a target value for the output current $i_p(t)$ (steps S19 to S20), and a converter control step of controlling the converter 2 based on an error $\Delta(t)$ between the output current $i_p(t)$ and the target current $j(t)$ (step S16). The target current generation step includes a correction amount calculation step of calculating a correction amount $j_h(t)$ for the target current $j(t)$ based on the asymmetry of the current detected in the load current detection step (step S4) in order to suppress the DC component $I_D$ in the AC power (step S20), and a correction step of correcting the target current $j(t)$ using the correction amount $j_h(t)$ (step S19).

In this configuration, there can be provided a DC component suppression method for a quick-response, high-accuracy and small-size power conversion device which can suppress the DC component in the AC power to be outputted therefrom without using a large part such as a reactor.

Figure 13:
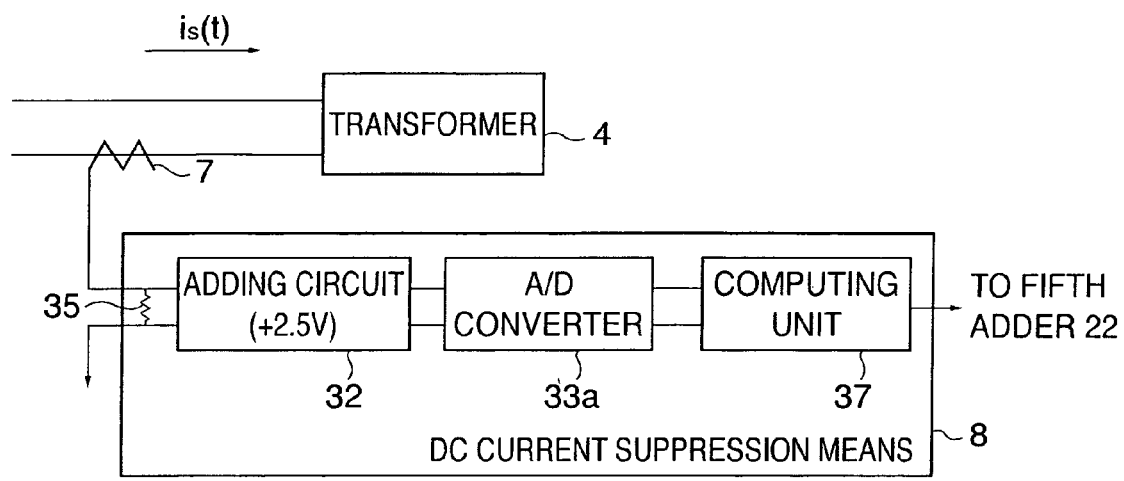
FIG. 13 shows an example of the circuit configuration of a DC component suppression means 8.

FIG. 13 shows an example of the circuit configuration of the DC component suppression means 8. The case where the load 4 is a transformer is described for easy explanation. The load current $i_s(t)$ flowing through the primary side of the transformer 4 is detected by a hall element as the second current detection means 7 and converted to a voltage by the resistor 35. 2.5 V is added to the converted voltage in the adding circuit 32 to shift the zero-point, and the result is inputted into an AD converter 33a and converted into a digital value. Then, a correction amount (correction current) $j_h(t)$ is calculated in the computing unit 37, and the output from the computing unit 37 is provided to the fifth adder 22.

Figure 14:
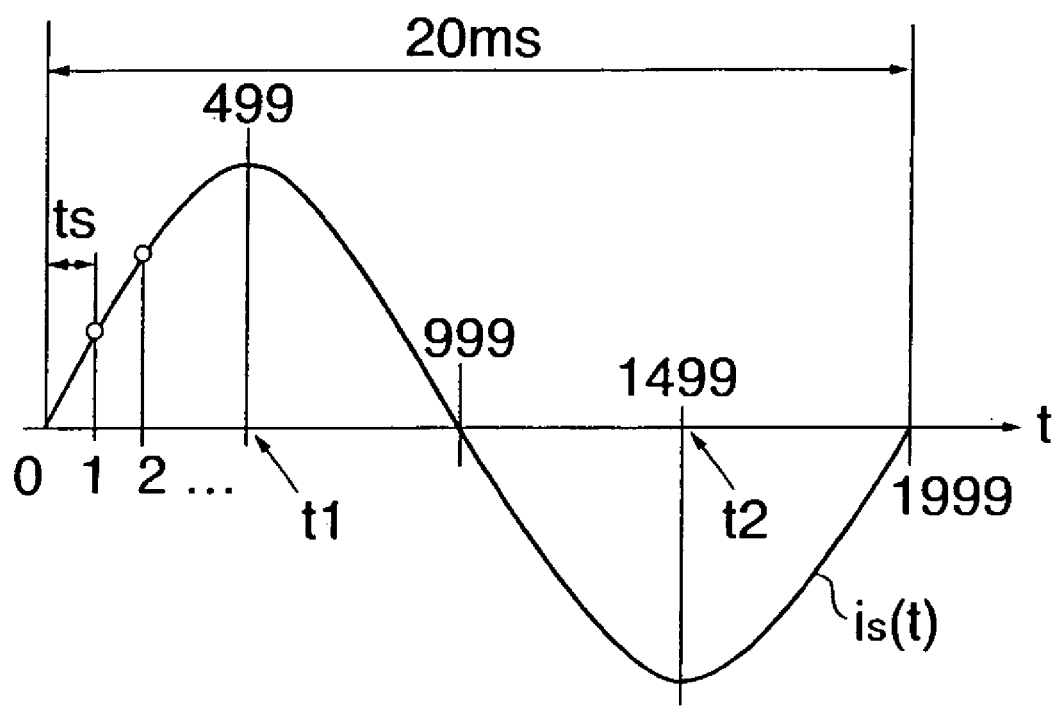
FIG. 14 shows an example of the waveform of a load current $i_s(t)$ in an arbitrary cycle thereof.

FIG. 14 shows an example of the waveform of the load current $i_s(t)$ in an arbitrary cycle thereof. Digital sampling of the waveform with a cycle of 20 ms is conducted every moment. For example, when the sampling time ts is 10 μsec, the counter value is reset to 0 at 2000 counts corresponding to one cycle because 20 ms/10 μs=2000. When the counter value at a first time point t1 is 0, the counter value at a second time point t2 after a half cycle is 999. In the example shown in FIG. 14, the counter value at a first time point t1 is 499 and the counter value at a second time point t2 is 1499.

Figure 15A:
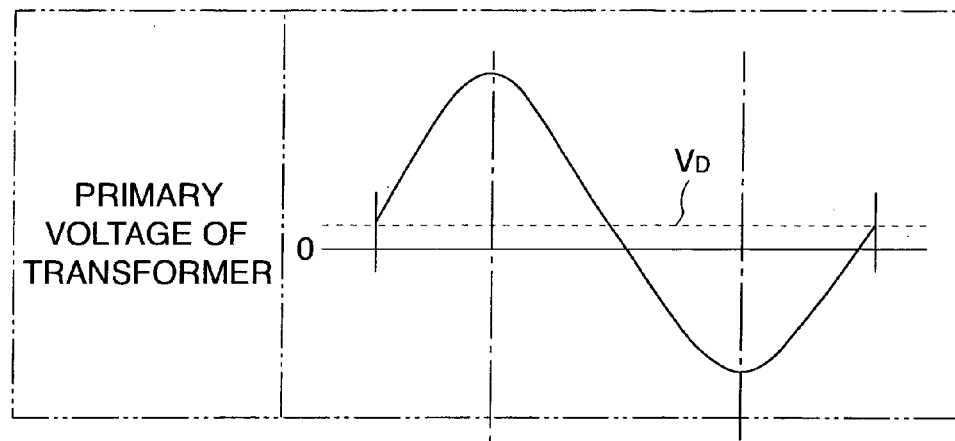
FIG. 15A is a view for explaining the concept of correction in the fifth embodiment (a view of the waveform of an output terminal voltage of transformer).
Figure 15B:
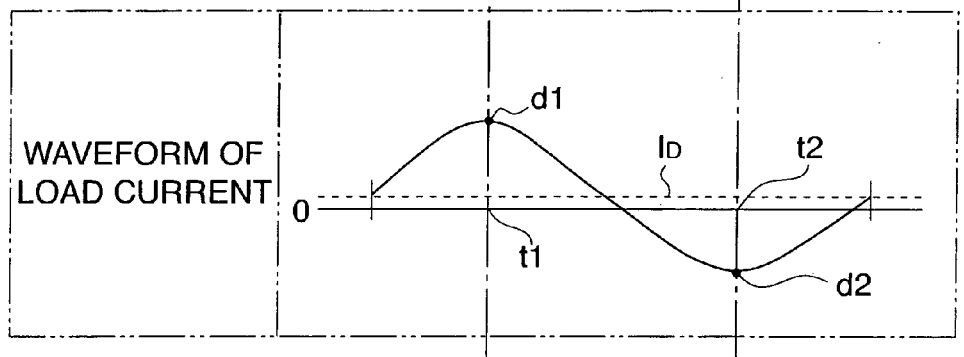
FIG. 15B is a view for explaining the concept of correction in the fifth embodiment (a view of the waveform of a load current).
Figure 15C:
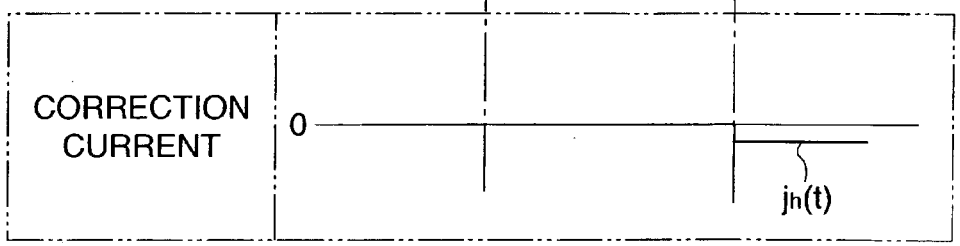
FIG. 15C is a view for explaining the concept of correction in the fifth embodiment (a view of a correction current).

FIG. 15A, FIG. 15B and FIG. 15C are views for explaining the concept of correction in the fifth embodiment. FIG. 15A shows the waveform of an output terminal voltage (filter voltage) v(t), that is, the waveform of the primary voltage of the transformer 4, FIG. 15B shows the waveform of a load current $i_s(t)$, and FIG. 15C shows a correction amount (a correction current) $j_h(t)$. The filter voltage v(t) and the load current $i_s(t)$ contain DC components $V_D$ and ID, respectively. Load current data $d1=i_s(t1)$ are sampled at a first time point t1, and load current data $d2=i_s(t2)$ are sampled at a second time point t2 that is a half cycle later than the first time point t1. When the absolute values of them are compared, there is a difference between them when a DC component $I_D$ is contained. When there is a difference, a value obtained by multiplying the difference by a gain G is added in such a direction as to suppress the DC component $I_D$ as a correction amount (correction current) $j_h(t)$. In this example, because the load current $i_s(t)$ is DC-biased in the positive direction, a negative correction amount $j_h(t)$ as shown in FIG. 15C is added.

Figure 16:
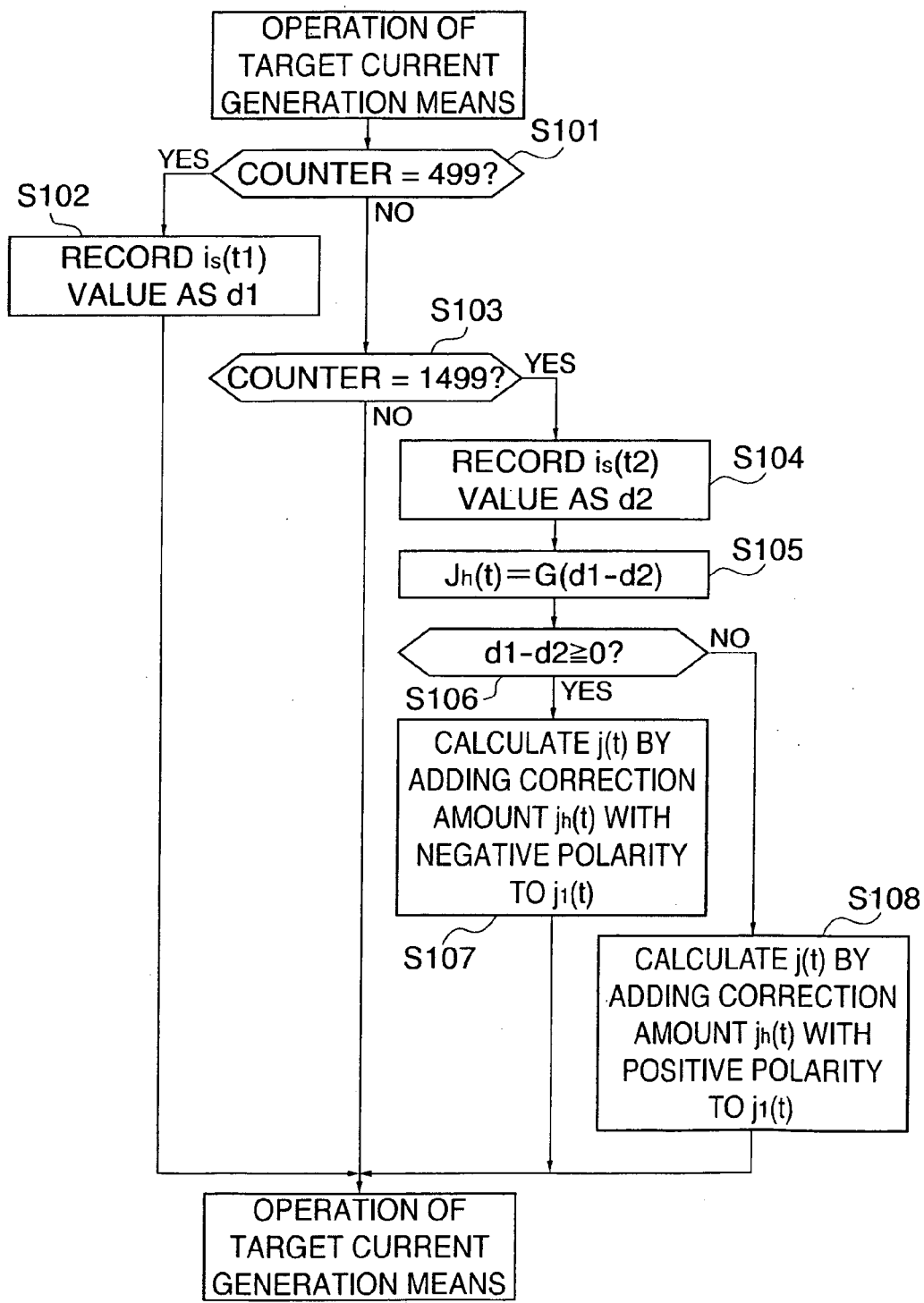
FIG. 16 shows an example of the flowchart of the processing program in a computing unit of the fifth embodiment.

FIG. 16 shows an example of the flowchart of the processing program in the computing unit 37 (see FIG. 13). A counter is actuated when the target current generation means 110 is operating, and, if the counter value at a first time point t1 is 499, for example (YES in step S101), the load current data (instantaneous value) $i_s(t1)$ at the first time point t1 are recorded as d1 (step S102). Next, if the counter value at a second time point t2 that is a half cycle later than the first time point t1 is 1499 (YES in step S103), the load current data (instantaneous value) $i_s(t2)$ at the second time point t2 are recorded as d2 (step S104). After recording, the difference between d1 and d2 is calculated, and a value is calculated by multiplying the difference by a gain G as a correction amount $j_h(t)$ (step S105). If d1>=d2 (YES in step S106), the correction amount $j_h(t)$ with negative polarity is added to the first target current $j_f(t)$ to obtain a target current j(t) (step S107). If d1<d2 (NO in step S106), the correction amount $j_h(t)$ with positive polarity is added to the first target current $j_f(t)$ to obtain a target current j(t) (step S108). If NO in step S101 and step S103, counting is continued.

As described above, in this embodiment, a target current j(t) is calculated by adding a DC current as a correction amount $j_h(t)$ to the first target current $j_f(t)$ in such a direction as to suppress the distortion of the current flowing to the transformer. This is a control method in which an instantaneous value $i_s(t1)(=d1)$ of the load current $i_s(t)$ at an arbitrary time point and an instantaneous value $i_s(t2)(=d2)$ of the load current $i_s(t)$ a half cycle later are detected, the difference between them is obtained to obtain the polarity of DC bias and the correction amount $j_h(t)$ is added to the first target current $j_f(t)$ in such a direction as to suppress the DC bias. Therefore, the processing amount is significantly small as compared with a correction method in which a DC component is obtained by integrating a voltage or current. Since only an instantaneous value at an arbitrary time point and an instantaneous value a half cycle later are compared, the program can be simplified. Also, since a correction amount for correcting the DC component is obtained from a detected load current according to a previously programmed process, the device can be small in size. Further, there is no need for a peak hold circuit. The correction amount $j_h(t)$ may be a value obtained by multiplying the difference between two instantaneous values d1 and d2 of two time points t1 and t2 by a gain G or may be a fixed value.

As described above, the DC component suppression means 8 in this embodiment calculates a correction amount $j_h(t)$ for correcting the target current j(t) from the difference between a first instantaneous value d1 of the load current $i_s(t1)$ at a first time point t1 and a second instantaneous value d2 of the load current $i_s(t2)$ at a second time point t2 that is approximately a half cycle later than the first time point t1. Although the second time point t2 is preferably exactly a half cycle later than the first time point t2, a small difference is allowed. For example, an error within ±1% is acceptable.

In this configuration, since the asymmetry of the load current can be detected within a half cycle of AC power, the response concerning the DC component suppression can be quick.

Next, the case where there is a half-wave rectification load is described. For example, when a half-wave rectification load composed of a rectifier diode and a load is connected via a transformer as a load to a single-phase power conversion device without measures against biased magnetization, that is, without measures for DC component suppression as shown in FIG. 21, generation of biased magnetization is unavoidable.

Figure 17A:
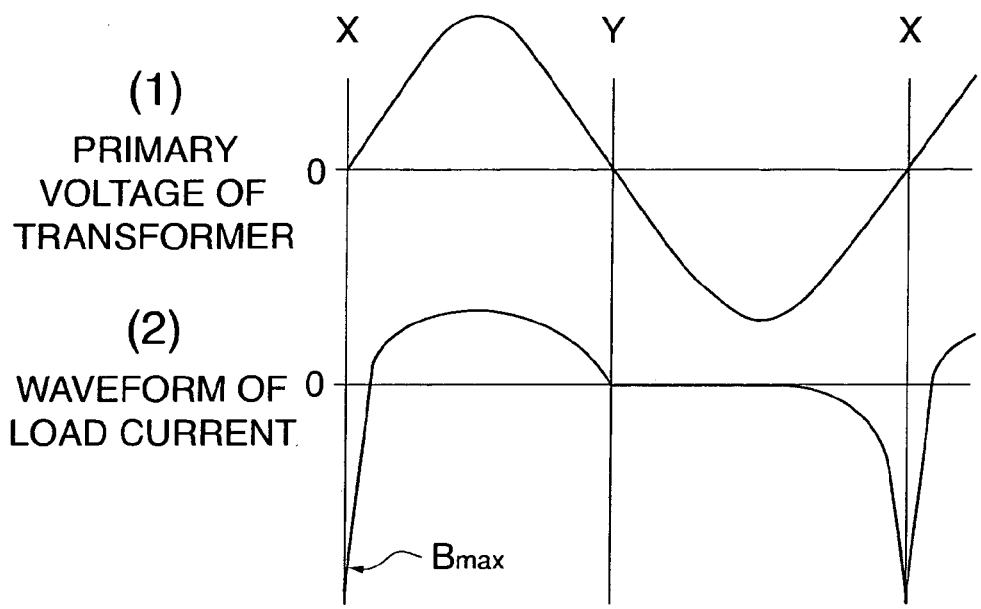
FIG. 17A schematically shows the waveforms of voltage and current when a half-wave rectification load is connected via a transformer as a load to a single-phase power conversion device without measures for DC component suppression and biased magnetization is generated in the transformer.
Figure 17B:
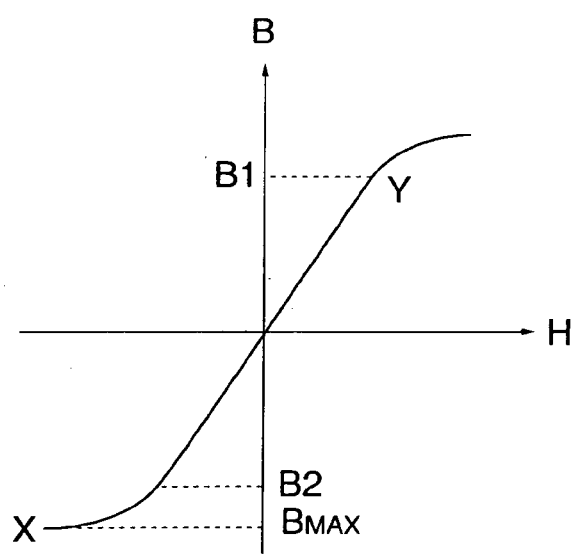
FIG. 17B schematically shows the B-H curve when a half-wave rectification load is connected via a transformer as a load to a single-phase power conversion device without measures for DC component suppression and biased magnetization is generated in the transformer.

FIGS. 17A and 17B schematically show the waveforms of voltage and current and the B-H curve when a half-wave rectification load is connected via a transformer as a load to a single-phase power conversion device without measures for DC component suppression and biased magnetization is generated in the transformer. FIG. 17A shows the waveforms of voltage and current saturated by the half-wave rectification load (the waveform of the primary voltage of the transformer is shown in the upper section (1), and the waveform of the load current is shown in the lower section (2)), and FIG. 17B shows the B-H curve (the vertical axis and horizontal axis represent the magnetic flux density B and the magnetic field H, respectively). The points X and Y on the waveforms of the voltage and current correspond to point X and Y, respectively, on the B-H curve. When there is a half-wave rectification load, the transformer is saturated (with a AC component alone) even if no DC voltage is applied to the transformer (only an AC component is applied). That is, when the voltage applied to an excitation inductance L of the transformer (shown in FIG. 17A(1)) is unbalanced by an external factor (half-wave rectification load) or an internal factor (deviation of the zero-line caused by temperature drift), the transformer, which has been using the region between B1 and B2 (linear region) as a magnetizing region, expands the magnetizing region to the saturated region $B_{MAX}$. As a result, biased magnetization occurs and a distortion is introduced in the load current as shown in FIG. 17A(2).

The distortion can be reduced by adding a DC current as a correction amount as shown in FIG. 15C, and a region which does not reach the saturated region $B_{MAX}$ can be used as the magnetizing region. Therefore, even when a half-wave rectification load is connected in the load, control for suppressing biased magnetization of the transformer can be performed using the processing program shown in FIG. 16.

Sixth Embodiment

A sixth embodiment of the present invention is next described. A single-phase power conversion device according to this embodiment is the same in construction as the single-phase power conversion device according to the fifth embodiment shown in FIG. 11 except for the correction procedure in the DC component suppressing means 8 and the constitution inside the DC component suppressing means 8. That is, positive and negative peak values of the load current are detected instead of instantaneous values of the load current, and a DC current is added as a correction amount to decrease either one of them with a greater absolute value. Typically, the period in which the peak values are obtained is one cycle of AC power.

Figure 18A:
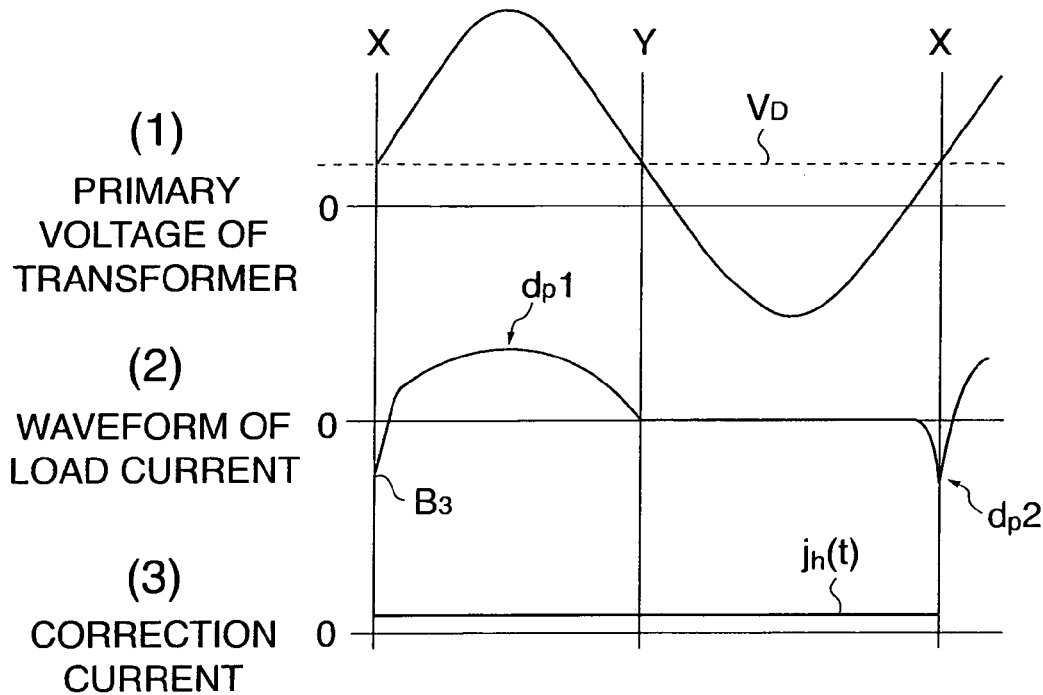
FIG. 18A shows an example of the waveforms of voltage and current in the sixth embodiment.
Figure 18B:
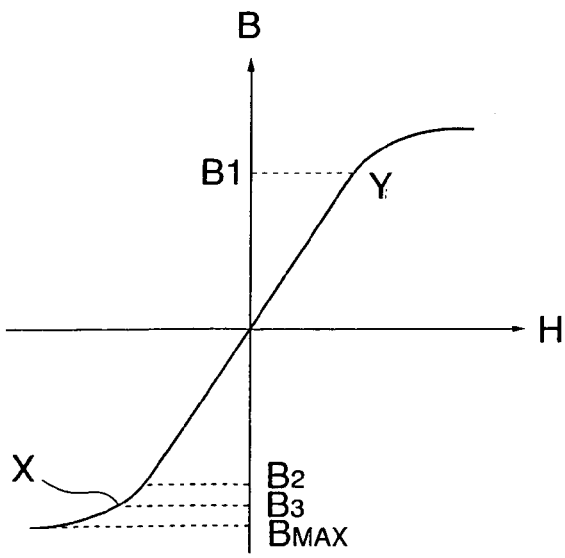
FIG. 18B shows an example of the B-H curve in the sixth embodiment.

FIGS. 18A and 18B show an example of the waveforms of voltage and current and the B-H curve in the sixth embodiment of the present invention. FIG. 18A shows the waveforms of voltage and current (the waveform of the primary voltage of the transformer is shown in the upper section (1), the waveform of the load current is shown in the middle section (2), and the correction amount (correction current) is shown in the lower section (3)). FIG. 18B shows the B-H curve (the vertical axis and horizontal axis represent the magnetic flux density B and the magnetic field H, respectively). The points X and Y on the waveforms of the voltage and current correspond to point X and Y, respectively, on the B-H curve. In this embodiment, a DC current is applied to a first target current $j_t(t)$ as a correction amount $j_h(t)$ in such a direction as to suppress the distortion of the current flowing through the transformer. Therefore, the zero line of the primary voltage can be shifted as shown in FIG. 18A, and the region between B1 and B3, which does not reach the saturated region $B_{MAX}$, can be used as the magnetizing region. Then, the negative peak value can be smaller than that in FIG. 17A(2) as shown in FIG. 18B(2), and a current waveform which does not cause saturation of the transformer can be realized. Also, even when a half-wave rectification load is connected, biased magnetization of the transformer can be suppressed by applying a DC current as a correction amount in such a direction as to suppress the distortion of the current flowing through the transformer.

Figure 19:
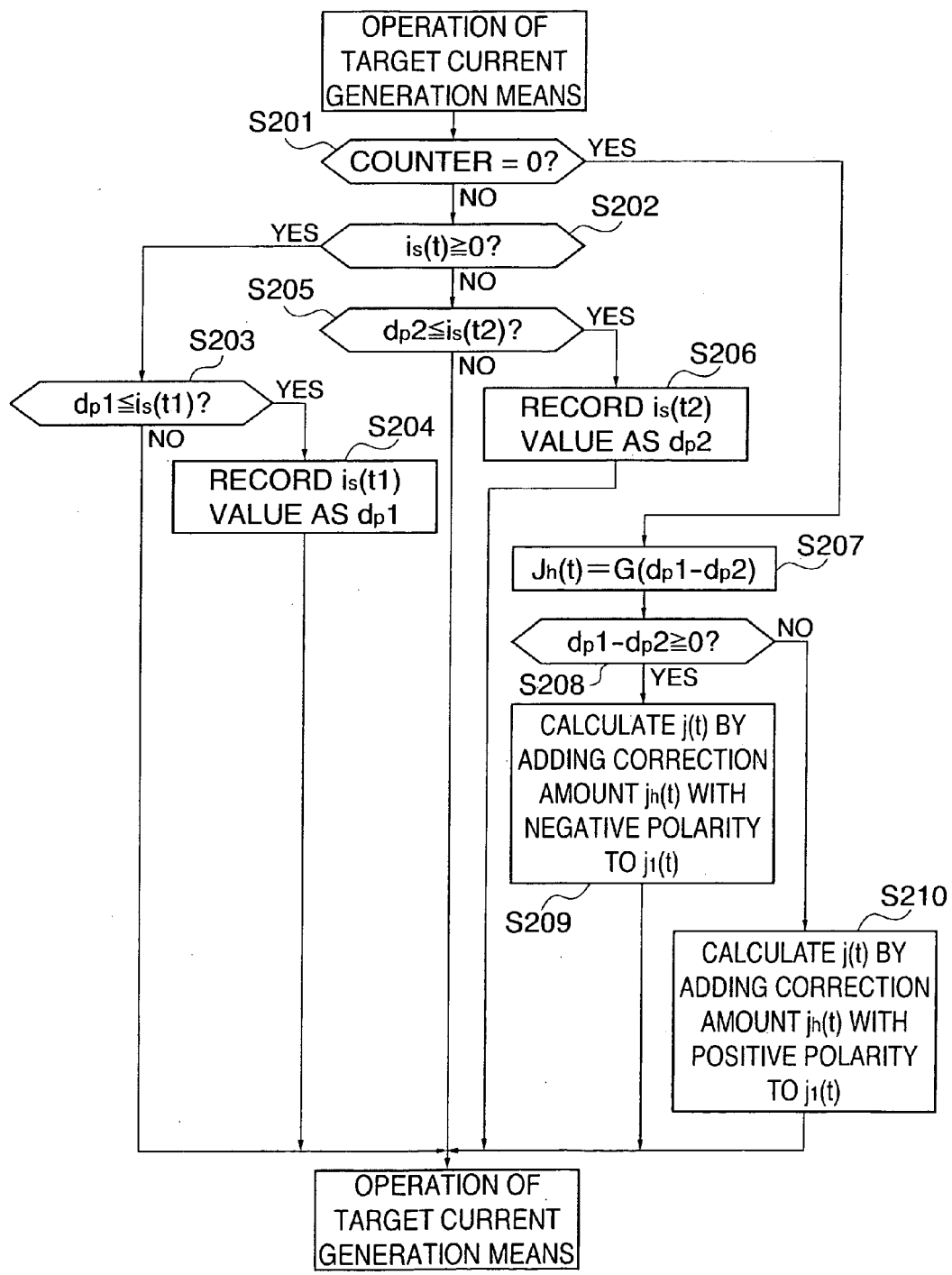
FIG. 19 shows an example of the flowchart of the processing program in a computing unit of the sixth embodiment.

FIG. 19 shows an example of the flowchart of the processing program in the computing unit 37 (see FIG. 13) of the sixth embodiment.

When the target current generation means 110 is operating, a counter in the DC component suppression means 8 is actuated and it is determined whether a periodic calculation has been completed or not by checking whether the counter has been reset to 0 or not (step S201). If the counter is not 0 (NO), it is determined whether the load current is in a positive half cycle or a negative half cycle (step S202). If the load current is in a positive half cycle (YES), it is determined whether load current data $i_s(t1)$ at a time point t1 detected by the second current detection means 7 exceeds a positive peak value $d_p1$ recorded at the moment (step S203). If not (NO), the positive peak value $d_p1$ is maintained, and if so (YES), the value $i_s(t1)$ is recorded as $d_p1$ (step S204). If the load current is in a negative half cycle (NO) in step S202, it is determined whether load current data $i_s(t2)$ at a time point t2 detected by the second current detection means 7 exceeds a negative peak value $d_p2$ recorded at the moment (step S205). If not (NO), the negative peak value $d_p2$ is maintained, and if so (YES), the value $i_s(t2)$ is recorded as $d_p2$ (step S206). A peak value in a positive half cycle and a peak value in a negative half cycle are thereby recorded as $d_p1$ and $d_p2$, respectively. If the counter is 0 (YES) in step S201, the difference between the positive and negative peak values $d_p1$ and $d_p2$ is obtained (step S207), and a value obtained by multiplying the difference by a gain G, for example, is determined as a correction amount $j_h(t)$. If $d_p1 >= d_p2$ (YES at step S208), a DC current value with negative polarity is added as the correction amount $j_h(t)$ to the first target current $j_t(t)$ to obtain a target current $j(t)$ (step S209). If $d_p1 < d_p2$ (NO at step S208), a DC current value with positive polarity is added as the correction amount $j_h(t)$ to the first target current $j_t(t)$ to obtain a target current $j(t)$ (step S210).

In the description of the flow of the processing program, the load current data $i_s(t1)$ and $i_s(t2)$ and the peak values $d_p1$ and $d_p2$ are absolute values. The correction amount $j_h(t)$ may be a value obtained by multiplying the difference between two peak values $d_p1$ and $d_p2$ by a gain G or may be a fixed value. The cycle in which the difference between the peak values is obtained, that is, the cycle of correction, may be coincident with the cycle of the AC power or may be once in a plurality of cycles of the AC power. The counter is reset in every cycle of the correction and the next correction cycle is repeated. When the counter is 0, the default values of $d_p1$ and $d_p2$ are both 0. When the counter is reset to 0, the values of $d_p1$ and $d_p2$ are also reset to 0.

According to this embodiment, a DC current is applied to the first target current $j_t(t)$ as a correction amount $j_h(t)$ to calculate a target current $j(t)$ so that the distortion of the current flowing through the transformer can be suppressed as in the fifth embodiment. Therefore, the zero line of the primary voltage can be shifted, and the region which does not reach the saturated region $B_{MAX}$ can be used as the magnetizing region. Then, a current waveform which does not cause saturation of the transformer as shown in FIG. 18A(2) can be realized. Therefore, even when a half-wave rectification load is connected in the load, control for suppressing biased magnetization of the transformer can be performed.

As described above, the DC component suppression means 8 in this embodiment calculates a correction amount $j_h(t)$ for correcting the target current $j(t)$ from the difference between a positive peak value $d_p1$ and a negative peak value $d_p2$ of the load current in an arbitrary cycle.

In this configuration, the asymmetry of the load current $i_s(t)$ can be detected with high precision and the DC component can be easily suppressed. Also, even when a half-wave rectification load is connected in the load via a transformer, biased magnetization of the transformer can be suppressed.

Seventh Embodiment

A three-phase power conversion device as a seventh embodiment is next described. The approach for suppression of DC component in the case of a three-phase power conversion device is basically the same as in the case of a single-phase power conversion. In a three-phase power conversion device, correction amounts $j_{ha}(t)$, $j_{hb}(t)$ and $j_{hc}(t)$ are calculated for correction of three target currents $j_a(t)$, $j_b(t)$ and $j_c(t)$, respectively, and a DC component suppression approach similar to the that for a single-phase power conversion device is applicable. In the three-phase power conversion device, the voltage detection means 18 detects line voltages $v_{ab}(t)$, $v_{bc}(t)$, and $v_{ca}(t)$ (or filter voltages) across three output terminals u, v and w the output terminal voltage $<v(t)>$, the output current $<i_p(t)>$ detected by the first current detection means 19 has three components $i_{pa}(t)$, $i_{pb}(t)$ and $i_{pc}(t)$, and the load current $<i_s(t)>$ detected by the second current detection means 7 has three components $i_{sa}(t)$, $i_{sb}(t)$ and $i_{sc}(t)$. The target current generation means 110 processes the three components. The output voltage $<i_p(t)>$ and the load current $<i_s(t)>$ have to be detected in at least two phases since the current component of a third phase can be derived from the current components of first and second phases. At least two line voltage components have to be detected as the output terminal voltage $<v(t)>$ since a third line voltage component can be derived from first and second line voltage components.

Figure 20:
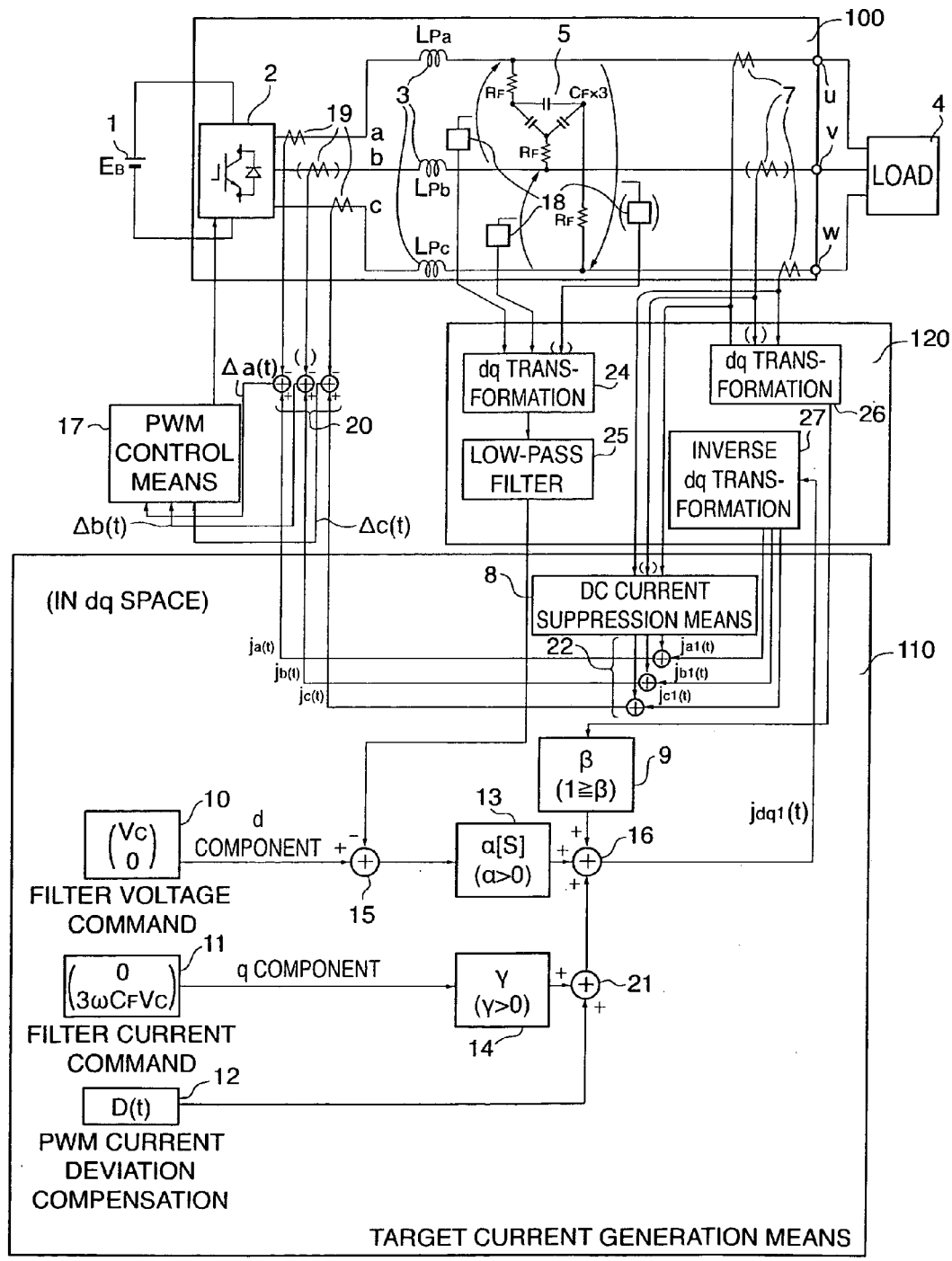
FIG. 20 shows an example of the circuit configuration of a three-phase power conversion device according to a seventh embodiment.

FIG. 20 shows an example of the circuit configuration of a three-phase power conversion device according to a seventh embodiment of the present invention. Those parts having the same functions as those in FIGS. 11 and 23 are designated in FIG. 20 by the same reference numerals, and the differences are mainly described. The device shown in FIG. 20 is different from the device shown in FIG. 23 in that a DC component suppression means 8 and a fifth adder 22 are located on the output side of an inverse dq transformer 27 in the target current generation means 110. Also, "the target current $<j_{dq}(t)>$" in the dq space outputted from the fourth adder 16 is changed to "a first target current $<j_{dq1}(t)>$ $(j_{d1}(t), j_{q1}(t))$" in the dq space, and "the target current $<j(t)>$" outputted from the inverse dq transformer 27 as a result of inverse dq transformation therein is changed to "a first target current $<j_1(t)>(j_{a1}(t), j_{b1}(t), j_{c1}(t))$". The signal conversion means 120 has the same function as that in FIG. 23. When receiving a load current $<i_s(t)>$ detected by the second current detection means 7, the DC component suppression means 8 calculates correction amount $<j_h(t)>$ for the target current and inputs it into the fifth adder 22, which in turn adds the correction amount $<j_h(t)>$ to the first target current $<j_f(t)>$ outputted from the inverse dq transformer 27 and outputs a target current $<j(t)>$. The seventh embodiment is different from the fifth embodiment (see FIG. 11) in that the target current j(t) has three components and that arithmetic processing is performed in the dq space in the target current generation means 110 and so on for convenience of calculation. The brackets ( ) in FIG. 20 means that the parts in the brackets can be omitted.

The first current detection means 19 is located in the vicinity of the converter 2 on the three lines a, b and c and detect an output current $<i_p(t)>$ outputted from the converter 2 to the inductors 3 (inductance components $L_{pa}$, $L_{pb}$ and $L_{pc}$) The first current detection means 19 has to detect the output current in at least two phases. The second current detection means 7 is located in the vicinity of the output terminals u, v and w on the lines a, b and c and detects the load current $<i_s(t)>$ flowing through the three phases. The second current detection means 7 have to detect the load current in at least two phases. The voltage detection means 18 is located in the vicinity of the filter circuit 5 and detects the output terminal voltage (line voltage)$<v(t)>$ across the lines. The voltage detection means 18 has to detect at least two output terminal voltages. In the case of a three-phase power conversion device, the first adder 20 calculates three errors $<\Delta(t)>$ (in phases a, b and c), and the fifth adder 22 calculates three target currents $<j(t)>$ (for phases a, b and c).

That is, the power conversion device according to this embodiment is a three-phase power conversion device which produces three-phase AC power from a DC power source 1 and supplies the power to a load 4 connected to the output terminals u v and w, and has a converter 2 for converting the DC power from the DC power source 1 to three-phase AC power, inductors 3 connected to the AC side of the converter 2, a first current detection means 19 for detecting an output current $<i_p(t)>(i_{pa}(t), i_{pb}(t), i_{pc}(t))$ flowing through the inductors 3, a second current detection means 7 for detecting the load current $<i_s(t)>(i_{sa}(t), i_{sb}(t), i_{sc}(t))$ being supplied to the load 4, a target current generation means 110 for generating a target current $<j(t)>(j_a(t), j_b(t), j_c(t))$ as a target value for the output current $<i_p(t)>(i_{pa}(t), i_{pb}(t), i_{pc}(t))$, and a PWM control means 17 (converter control means) for pulse width modulation control of the converter 2 based on an error $<\Delta(t)>(\Delta_a(t), \Delta_b(t), \Delta_c(t))$ between the output current $<i_p(t)>$ and the target current $<j(t)>$. The target current generation means 110 has a DC component suppression means 8 for suppressing a DC component in the three-phase AC power by correcting the target current $<j(t)>(j_a(t), j_b(t), j_c(t))$ based on the asymmetry of the load current $<i_s(t)>(i_{sa}(t), i_{sb}(t), i_{sc}(t))$ detected by the second current detection means 7.

In this configuration, there can be provided a quick-response, high-accuracy and small-size three-phase power conversion device which can suppress the DC component in the AC power to be outputted therefrom without using a large part such as a reactor. Also, even when a half-wave rectification load is connected in the load via a transformer, control for suppressing biased magnetization of the transformer can be performed.

The DC component suppression method in a power conversion device corresponding to this embodiment (see FIG. 12A and FIG. 12B) is a DC component suppression method in a power conversion device which converts DC power to supply AC power and includes a conversion step of converting DC power to AC power in a converter 2 (step S1), a power supply step of supplying the AC power to a load 4 (step S2), a load current detection step of detecting a load current $<i_s(t)>$flowing to a load 4 (step S4), an output current detection step of detecting an output current $<i_p(t)>$ flowing from the converter 2 through inductors 3 on a lines a, b and c (step S5), a target current generation step of generating a target current $<j(t)>$ as a target value for the output current $<i_p(t)>$ (steps S19 to S20), and a converter control step of controlling the converter 2 based on an error $<\Delta(t)>$ between the output current $<i_p(t)>$ and the target current $<j(t)>$ (step S16). The target current generation step includes correction amount calculation step of calculating a correction amount $<j_h(t)>(j_{ha}(t), j_{hb}(t), j_{hc}(t))$ for the target current $<j(t)>$based on the asymmetry of the current detected in the load current detection step (step S4) (step S20), and a correction step of correcting the target current $<j(t)>$ using the correction amount $<j_h(t)>$ (step S19).

In this configuration, there can be provided a quick-response and high-accuracy converter which has a DC component suppression means for a three-phase power conversion device which can suppress a DC component in the AC power to be outputted from the power conversion device without using a large part such as a reactor. Also, even when a half-wave rectification load is connected in the load, control for suppressing biased magnetization of the transformer can be performed.

The DC component suppression means 8 in this embodiment calculates a correction amount $<j_h(t)>$for correcting the target current $<j(t)>$ from the differences between a first instantaneous value d1 of the load current $<i_s(t1)>$at a first time point t1 and a second instantaneous value d2 of the load current $<i_s(t2)>$at a second time point t2 that is approximately a half cycle later than the first time point t1 detected in at least two phases.

In this configuration, since the asymmetry of the load current $<i_s(t)>$can be detected within a half cycle of AC power, the response concerning the DC component suppression can be quick also in a three-phase power conversion device.

Eighth Embodiment

An eighth embodiment of the present invention is next described. A three-phase power conversion device according to this embodiment is the same in constitution as the three-phase power conversion device according to the seventh embodiment shown in FIG. 20 except for the correction procedure in the DC component suppressing means 8 and the constitution inside the DC component suppressing means 8. That is, positive and negative peak values of the load current are detected instead of instantaneous values of the load current and DC current is added as a correction amount to decrease either one of them with a greater absolute value. Typically, the period in which the peak values are obtained is one cycle of AC.

That is, the DC component suppression means 8 in this embodiment calculates a correction amount $<j_h(t)>$ for correcting the target current <j(t)> from the difference between a positive peak value $d_p1$ and a negative peak value $d_p2$ of the load current detected in at least two phases in an arbitrary cycle.

Then, the asymmetry of the load current <$i_s(t)$> can be detected with high precision and the DC component can be easily suppressed in three-phase AC power.

The embodiments of the present invention have been described. The present invention is not limited to the embodiments described above, and various modifications can be made to the present invention without departing from the scope thereof, through.

For example, although the load is directly connected to the output terminals of the power conversion device in the above embodiments, the present invention is applicable when there is a transformer at the output terminal of the power conversion device. When the primary voltage v(t) applied to the primary side of the transformer is detected as the output terminal voltage by the voltage detection means and the target current j(t) is corrected by the DC component suppression means 8, a DC component in the AC power outputted from the converter and flowing to the transformer can be suppressed and biased magnetization of the transformer can be prevented. When the load current flowing through the primary side of the transformer is detected by the second current detection means and the target current is corrected by the DC component suppression means, a DC component in the AC power outputted from the converter and flowing to the transformer can be suppressed and biased magnetization of the transformer can be prevented.

The power conversion device is a single-phase power conversion device or a three-phase power conversion device in the above embodiment. The present invention is applicable to a power conversion device with a different phase structure such as a six-phase power conversion device. The sampling of the instantaneous values or peak values is not necessarily performed within a half cycle or one cycle, and an average of values sampled in a plurality of cycles may be used. The correction amount is not limited to a value obtained by multiplying the difference between instantaneous values by a gain or a fixed value and may be a value obtained by multiplying the difference of peak values by a gain for example. A threshold value may be set for the difference between the instantaneous values or the peak values so that the correction amount is not added when the difference is smaller than the threshold. Also, since either a positive or negative DC current is generated in many cases, the polarity of the correction current may be set to either positive or negative and correction may be made when a peak on the side exceeds a threshold. A plurality of correction amounts may be prepared so that an appropriate correction amount can be used depending on the degree of asymmetry of the load current.

The target current generation means for generating a target current is not limited to the configuration described in the description of the above embodiments and may be of various configurations. For example, although the load current detected by the second current detection means is reflected to the target current in the above embodiments, the second current detection means may be omitted. Also, the filter current command $i_{CF}$ and the deviation compensation command D(t) may be omitted. The filter circuit may be composed of only capacitors $C_F$ without the resistances $R_F$. Also, αβ transformation may be used instead of dq transformation, or coordinate transformation may not be performed. The positions of the dq transformer 24 and the low-pass filter 25 may be exchanged, and the correction of the target current in the DC component suppression means 8 may be performed in the dq space. The main circuit, the target current generation means, the PWM control means, the dq transformers, the adders, the integration means, the multiplication means may be integrated in one circuit, may be formed independently, or may be divided into smaller units. The integration time and the gain values may be changed variously.

The present invention is utilized to suppress a DC component in AC power to be outputted from a power conversion device which produces AC power from DC power.

Reference numerals and symbols for main element used in this description are listed below.

1: DC power source
2: converter
3: inductor
4: load
5: filter circuit
6: DC voltage detection means
7: second current detection means
8: DC component suppression means
9: second amplifier
10: filter voltage command means
11: filter current command means
12: PWM current deviation compensation means
13: first amplifier
14: third amplifier
15: second adder
16: fourth adder
17: PWM control means
18: voltage detection means
19: first current detection means
20: first adder
21: third adder
22: fifth adder
23: sixth adder
24: first dq transformer
25: low-pass filter
26: second dq transformer
27: inverse dq transformer
31*a*, 31*b*: integration means
32: adding circuit
32*a*, 32*b*: multiplication means
33: correction amount calculation means
33*a*: AD converter
34, 34*a*, 34*b*: amplifier
35, 35*a*, 35*b*: low-pass filter
36*a*, 36*b*: doubler
37: computing unit
37*a*, 37*b*; adding circuit
38, 38*a*, 38*b*; photocoupler
39: $I_D$ polarity determination circuit
39*a*: $I_{aD}$ polarity determination circuit
39*b*: $I_{cD}$ polarity determination circuit
40: computing unit
100: main circuit
110: target current generation means
120: signal conversion means
a, a1, a2, b, c: line
$C_F$, $C_d$: capacitor
D(t): deviation compensation command
d1, d2: load current data (instantaneous value)
$d_p1$, $d_p2$: load current data (peak value)
$E_B$: source voltage of DC power source
G: gain
$I_D$: DC component of current
$i_p(t)$: output voltage $i_s(t)$: load current
$i_{CF}$: filter current command
$j(t)$: target current
$j_I(t)$: first target current
$j_h(t)$: correction amount for target current
$L_D$: inductance
$L_F$: reciprocal of gain
$R_F$, $R_d$: resistance
s: Laplace operator
t: time
t1, t2: time point
u, u1, u2, v, w: output terminal
v(t): output terminal voltage (filter voltage)
$v_C(t)$: filter voltage command
$V_D$: DC component in output terminal voltage
α, β, γ: amplification factor
Δ(t): error between output current and target current

What is claimed is:

1. A single-phase power conversion device which produces single-phase AC power from DC power source and supplies the power to a load connected to output terminals thereof, comprising:
 a converter for converting the DC power from the DC power source to single-phase AC power;
 an inductor connected to the AC side of the converter;
 a current detection means for detecting an output current flowing through the inductor;
 a voltage detection means for detecting an output terminal voltage applied across the output terminals;
 a target current generation means for generating a target current as a target value for the output current; and
 a converter control means for pulse width modulation control of the converter based on an error between the output current and the target current;
 wherein the target current generation means has a DC component suppression means for suppressing a DC component in the single-phase AC power by amplifying an integral of the output terminal voltage detected by the voltage detection means and using the amplified integral to correct the target current.

2. The single-phase power conversion device of claim 1, further comprising a filter circuit for removing a switching frequency component in the single-phase AC power connected between output terminals;
 wherein the voltage detection means detects a filter voltage applied to the filter circuit as the output terminal voltage, and
 the DC component suppression means amplifies an integral of the filter voltage and uses the amplified integral to correct the target current.

3. A single-phase power conversion device which produces single-phase AC power from DC power source and supplies the power to a load connected to output terminals, comprising:
 a converter for converting the DC power from the DC power source to single-phase AC power;
 an inductor connected to the AC side of the converter;
 a current detection means for detecting an output current flowing through the inductor;
 a voltage detection means for detecting an output terminal voltage applied across the output terminals;
 a target current generation means for generating a target current as a target value for the output current; and
 a converter control means for pulse width modulation control of the converter based on an error between the output current and the target current;
 wherein the voltage detection means has a DC voltage detection means composed of a circuit of a capacitor and a resistance connected in series between the output terminals for detecting a DC voltage component applied across the output terminals, and
 wherein the target current generation means has a DC component suppression means for suppressing a DC component in the single-phase AC power by correcting the target current based on the DC voltage component.

4. The single-phase power conversion device of claim 3, wherein the DC component suppression means has an amplification means for amplifying the DC component detected by the DC voltage detection means, and a determination means for determining the polarity of the voltage value of the DC component and outputting the voltage value with a sign based on the determination result.

5. A three-phase power conversion device which produces three-phase AC power from DC power source and supplies the power to a load connected to output terminals thereof, comprising:
 a converter for converting the DC power from the DC power source to three-phase AC power;
 inductors connected to the AC side of the converter;
 a current detection means for detecting an output current flowing through the inductors;
 a voltage detection means for detecting an output terminal voltage applied across the output terminals;
 a target current generation means for generating a target current as target value for the output current; and
 a converter control means for pulse width modulation control of the converter based on an error between the output current and the target current;
 wherein the target current generation means has a DC component suppression means for suppressing a DC component in the three-phase AC power by amplifying an integral of the output terminal voltage detected by the voltage detection means and using the amplified integral to correct the target current.

6. The three-phase power conversion device of claim 5, further comprising a filter circuit for removing a switching frequency component in the three-phase AC power connected between the output terminals;
 wherein the voltage detection means detects a filter voltage applied across connection points of the filter circuit and lines as the output terminal voltage, and
 wherein the DC component suppression means amplifies an integral of the filter voltage and uses the amplified integral to correct the target current.

7. A three-phase power conversion device which produces three-phase AC power from DC power source and supplies the power to a load connected to output terminals thereof, comprising:
 a converter for converting the DC power from the DC power source to three-phase AC power;
 inductors connected to the AC side of the converter;
 a current detection means for detecting an output current flowing through the inductors;
 a voltage detection means for detecting an output terminal voltage applied across the output terminals;
 a target current generation means for generating a target current as a target value for the output current; and
 a converter control means for pulse width modulation control of the converter based on an error between the output current and the target current;
 wherein the voltage detection means has a DC voltage detection means composed of circuits of a resistance and a capacitor connected in series between the output terminals for detecting DC voltage components applied across the output terminals, and wherein the target current generation means has a DC component suppression means for suppressing a DC component in the three-phase AC power by correcting the target current based on the DC voltage components.

8. The three-phase power conversion device of claim 7, wherein the DC component suppression means has an amplification means for amplifying two DC components detected by the DC component detection means, a first addition means for adding a double of a first DC component and a second DC component, a second addition means for adding the first DC component and a double of the second DC component, a first determination means for determining the polarity of the voltage value obtained in the first addition means and outputting the voltage value with a sign based on the determination result, and a second determination means for determining the polarity of the voltage value obtained in the second addition means and outputting the voltage value with a sign based on the determination result.

9. A single-phase power conversion device which produces single-phase AC power from DC power source and supplies the power to a load connected to output terminals thereof, comprising:

a converter for converting the DC power from the DC power source to single-phase AC power;

an inductor connected to the AC side of the converter;

a first current detection means for detecting an output current flowing through the inductor;

a second current detection means for detecting a load current being supplied to the load;

a target current generation means for generating a target current as a target value for the output current; and a converter control means for pulse width modulation control of the converter based on an error between the output current and the target current;

wherein the target current generation means has a DC component suppression means for suppressing a DC component in the single-phase AC power by correcting the target current based on asymmetry of the load current detected by the second current detection means.

10. The single-phase power conversion device of claim 9, wherein the DC component suppression means calculates a correction amount for correcting the target current from the difference between a first instantaneous value of the load current at a first time point and a second instantaneous value of the load current at a second time point that is approximately a half cycle after the first time point.

11. The single-phase power conversion device of claim 9, wherein the DC component suppression means calculates a correction amount for correcting the target current from the difference between a positive peak value and a negative peak value of the load current in an arbitrary cycle.

12. A three-phase power conversion device which produces three-phase AC power from DC power source and supplies the power to a load connected to output terminals, comprising:

a converter for converting the DC power from the DC power source to three-phase AC power;

inductors connected to the AC side of the converter;

a first current detection means for detecting an output current flowing through the inductors;

a second current detection means for detecting a load current being supplied to the load;

a target current generation means for generating a target current as target value for the output current; and a converter control means for pulse width modulation control of the converter based on an error between the output current and the target current;

wherein the target current generation means has a DC component suppression means for suppressing a DC component in the three-phase AC power by correcting the target current based on asymmetry of the load current detected by the second current detection means.

13. The three-phase power conversion device of claim 12, wherein the DC component suppression means calculates a correction amount for correcting the target current from the differences between first instantaneous values of the load current at a first time point and second instantaneous values of the load current at a second time point that is approximately a half cycle after the first time point detected in at least two phases.

14. The three-phase power conversion device of claim 12, wherein the DC component suppression means calculates a correction amount for correcting the target current from the differences between positive peak values and negative peak values of the load current detected in at least two phases in an arbitrary cycle.

* * * * *